United States Patent
Thurman et al.

(10) Patent No.: US 10,449,421 B2
(45) Date of Patent: Oct. 22, 2019

(54) BASKETBALL ELECTRONICS SUPPORT

(71) Applicant: Wilson Sporting Goods Co., Chicago, IL (US)

(72) Inventors: Robert T. Thurman, Plainfield, IL (US); Kevin L. Krysiak, Palatine, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 1378 days.

(21) Appl. No.: 14/212,932

(22) Filed: Mar. 14, 2014

(65) Prior Publication Data
US 2014/0200103 A1 Jul. 17, 2014

Related U.S. Application Data

(63) Continuation-in-part of application No. 14/071,384, filed on Nov. 4, 2013, now Pat. No. 9,656,140.
(Continued)

(51) Int. Cl.
| | |
|---|---|
| *A63B 41/08* | (2006.01) |
| *G09B 19/00* | (2006.01) |
| *A63B 43/00* | (2006.01) |
| *A63B 43/06* | (2006.01) |
| *A63B 67/00* | (2006.01) |
| *A63B 41/00* | (2006.01) |
| *A63B 71/06* | (2006.01) |

(52) U.S. Cl.
CPC ............ *A63B 41/08* (2013.01); *A63B 43/00* (2013.01); *A63B 43/06* (2013.01); *G09B 19/0038* (2013.01); *A63B 67/002* (2013.01); *A63B 2041/005* (2013.01); *A63B 2071/0625* (2013.01); *A63B 2208/12* (2013.01); *A63B 2220/12* (2013.01); *A63B 2220/30* (2013.01); *A63B 2220/35* (2013.01); *A63B 2220/40* (2013.01); *A63B 2220/56* (2013.01); *A63B 2220/72* (2013.01); *A63B 2225/20* (2013.01); *A63B 2225/50* (2013.01); *A63B 2225/54* (2013.01); *A63B 2243/0037* (2013.01)

(58) Field of Classification Search
CPC ... A63B 67/002; A63B 2208/12; A63B 41/08; A63B 45/00; A63B 45/02; A63B 43/00; A63B 41/00; A63B 41/005
USPC ........................................................ 473/415
See application file for complete search history.

(56) References Cited

U.S. PATENT DOCUMENTS

| | | | | |
|---|---|---|---|---|
| 5,102,131 | A * | 4/1992 | Remington | ............ A63B 43/06 428/11 |
| 5,883,569 | A * | 3/1999 | Kolefas | .................... A43B 3/00 273/372 |

(Continued)

FOREIGN PATENT DOCUMENTS

WO  WO2014/008202 A1 * 1/2014 ......... A63B 69/0071

*Primary Examiner* — Chase E Leichliter
(74) *Attorney, Agent, or Firm* — Terence P. O'Brien; Todd A. Rathe

(57) ABSTRACT

A game ball supports electronics. In one implementation, the electronics sense motion of the game ball and are encapsulated by potting compound which forms an encapsulating body sized and shaped to fit within a cavity of the game ball. In one implementation, a game ball comprises an inflatable body which supports the electronics, wherein an electrical conductive line is electrically connected to electronics extends along a surface of the inflatable body at least 60 degrees about the inflatable body.

22 Claims, 17 Drawing Sheets

FIG. 32

Related U.S. Application Data

(60) Provisional application No. 61/724,668, filed on Nov. 9, 2012, provisional application No. 61/798,738, filed on Mar. 15, 2013, provisional application No. 61/788,304, filed on Mar. 15, 2013, provisional application No. 61/799,851, filed on Mar. 15, 2013, provisional application No. 61/800,972, filed on Mar. 15, 2013, provisional application No. 61/891,487, filed on Oct. 16, 2013.

(56) References Cited

U.S. PATENT DOCUMENTS

| | | | |
|---|---|---|---|
| 2002/0123386 A1 | 9/2002 | Perlmutter | 473/223 |
| 2002/0137582 A1 | 9/2002 | Yu | 473/570 |
| 2003/0224885 A1 | 12/2003 | Leal et al. | 473/570 |
| 2005/0288134 A1 | 12/2005 | Smith | 473/570 |
| 2006/0063622 A1* | 3/2006 | Nurnberg | A63B 41/02 |
| | | | 473/604 |
| 2007/0281811 A1 | 12/2007 | Wang | 473/570 |
| 2008/0088303 A1 | 4/2008 | Englert | 324/226 |
| 2009/0040761 A1 | 2/2009 | Huang et al. | 362/253 |
| 2009/0062033 A1 | 3/2009 | Harada | 473/353 |
| 2009/0191990 A1 | 7/2009 | Smith | 473/570 |
| 2009/0210078 A1 | 8/2009 | Crowley | 700/91 |
| 2009/0325739 A1* | 12/2009 | Gold | A63B 43/00 |
| | | | 473/570 |
| 2010/0035710 A1 | 2/2010 | Smith | 473/570 |
| 2010/0069181 A1 | 3/2010 | Lin | 473/570 |
| 2010/0130314 A1* | 5/2010 | Von Der Gruen | A63B 63/00 |
| | | | 473/570 |
| 2010/0130315 A1* | 5/2010 | Steidle | A63B 41/02 |
| | | | 473/570 |
| 2010/0184563 A1 | 7/2010 | Molyneux et al. | 482/1 |
| 2010/0198043 A1 | 8/2010 | Holzer et al. | 600/388 |
| 2011/0118064 A1 | 5/2011 | Krysiak et al. | 473/603 |
| 2011/0118065 A1 | 5/2011 | Krysiak et al. | 473/603 |
| 2011/0119022 A1 | 5/2011 | Kuenzler et al. | 702/145 |
| 2011/0136603 A1 | 6/2011 | Lin et al. | 473/570 |
| 2011/0269517 A1 | 11/2011 | Englert et al. | 463/7 |
| 2012/0029666 A1 | 2/2012 | Crowley et al. | 700/91 |
| 2012/0058845 A1* | 3/2012 | Crowley | A63B 41/00 |
| | | | 473/604 |
| 2012/0244969 A1* | 9/2012 | Binder | A63H 33/18 |
| | | | 473/570 |
| 2014/0243122 A1* | 8/2014 | Crowley | A63B 43/06 |
| | | | 473/570 |
| 2015/0157900 A1* | 6/2015 | Holthouse | A63B 24/0021 |
| | | | 473/570 |
| 2016/0001136 A1* | 1/2016 | King | A63B 69/0071 |
| | | | 320/108 |

* cited by examiner

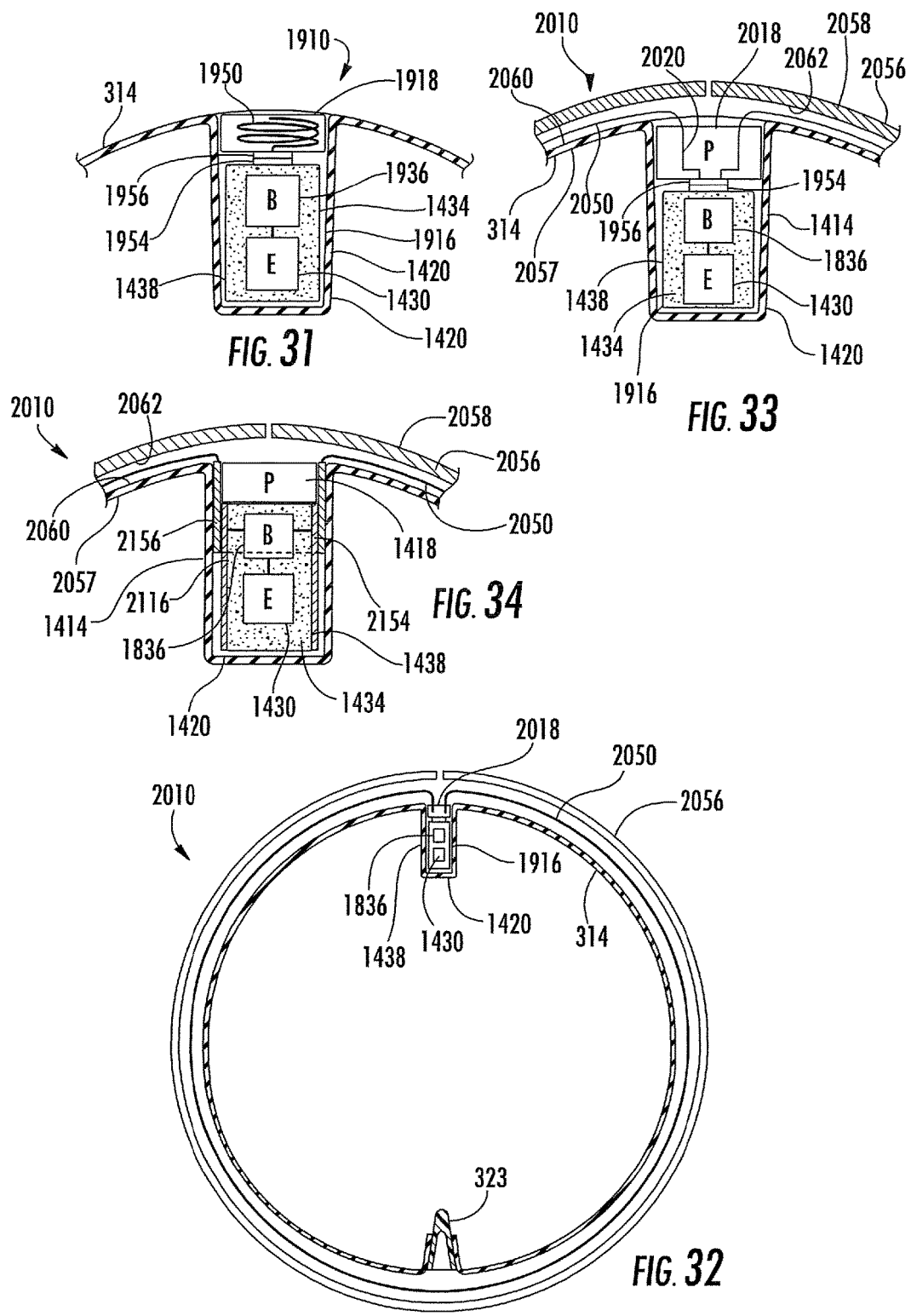

BASKETBALL ELECTRONICS SUPPORT

CROSS-REFERENCE TO RELATED PATENT APPLICATIONS

The present application is a continuation-in-part of U.S. patent application Ser. No. 14/071,384 titled SPORT PERFORMANCE SYSTEM WITH BALL SENSING, and filed on Nov. 4, 2013, which claims priority to U.S. Provisional Patent Application Ser. No. 61/724,668 filed on Nov. 9, 2012. The present application claims priority to U.S. Provisional Patent Application Ser. No. 61/799,851 titled BASKETBALL ELECTRONICS SUPPORT, and filed on Mar. 15, 2013, which is hereby incorporated by reference in its entirety. The present application also claims priority to U.S. Provisional Patent Application Ser. Nos. 61/798,738, 61/788,304 and 61/800,972, filed on Mar. 15, 2013, which are hereby incorporated by reference in their entirety. The present invention also claims priority to U.S. Provisional Patent Application Ser. No. 61/891,487 filed on Oct. 16, 2013, which is hereby incorporated by reference in their entirety.

BACKGROUND

The game of basketball is growing in popularity throughout the world. The game of basketball may be enjoyed by persons of all ages and may take many forms. The game of basketball may take the form of an organized game between organized teams, a pickup game at a local park or a game of horse in one's driveway. Regardless of what form the game of basketball takes, to be successful in the game of basketball requires the ability to make shots. Developing a proper shooting stroke and shooting touch is typically obtained through hours, weeks, months and years of practice. Such practice is often tedious and lacks sufficient feedback to facilitate optimal shooting skill improvement. Electronics are sometimes used to provide feedback for basketball shots. However, mounting and utilizing electronics on a basketball is difficult.

BRIEF DESCRIPTION OF THE DRAWINGS

FIG. 1A is a schematic diagram of an example of electronics of the ball of FIG. 1.

FIG. 31 is a fragmentary sectional view of an another example implementation of the basketball of FIG. 24.

FIG. 32 is a sectional view of an another example implementation of the basketball of FIG. 24.

FIG. 33 is a fragmentary sectional view of the basketball of FIG. 32.

FIG. 34 is a fragmentary sectional view of another example implementation of the basketball of FIG. 32.

DETAILED DESCRIPTION OF THE EXAMPLE EMBODIMENTS

Figure 1:
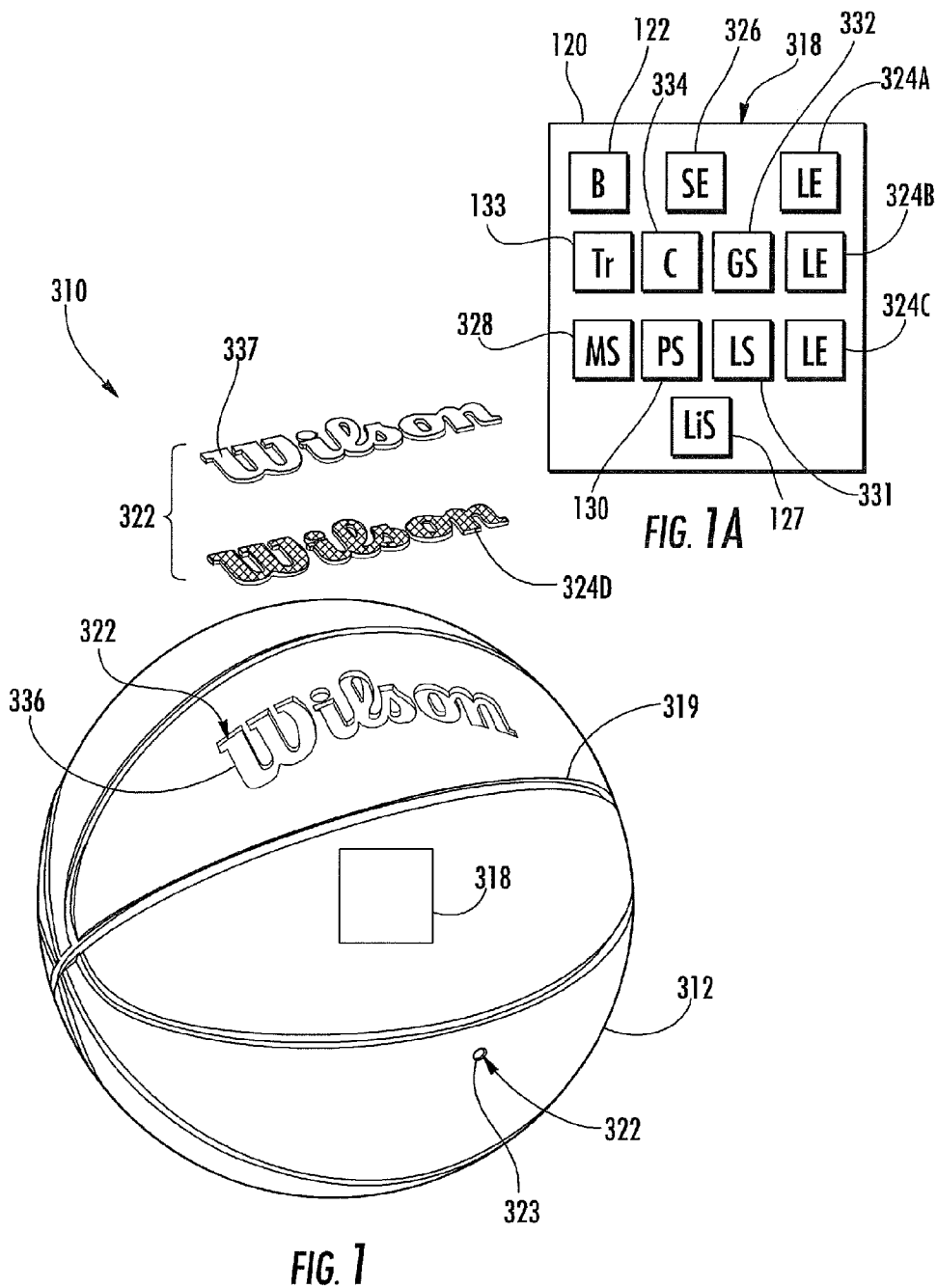
FIG. 1 is an exploded perspective view of an example ball.

FIG. 1 illustrates basketball 310, an example of a sports or game ball. The basketball 310 is a generally spheroidal shaped inflatable object. The basketball 310 is configured to be grasped, dribbled, passed and shot by a player during use. As shown by FIG. 1, basketball 310 comprises bladder 314, windings 315 (FIG. 2), cover 316, and electronic chip 318. In some embodiments, the basketball 310 can also include one or more logos 322.

Bladder 314 comprises an inflatable sphere formed from materials such as butyl rubber, natural rubber, a combination of butyl and natural rubber and other elastic materials. In one implementation, bladder 14 is made from 80% butyl rubber and 20% natural rubber. As will be described hereafter, in some implementations, some portions of bladder 14 or windows formed in bladder 14 may be formed from one or more transparent or translucent materials.

Windings 315 comprise a layer of wound reinforcing thread wound about or over bladder 314. In one implementation, prior to the application of cover 316, the reinforcing thread may be further coated or covered with a viscous material, such as a latex or adhesive. In one implementation, the reinforcing thread is passed through a viscous adhesive material prior to being wound about bladder 314. In one implementation, the windings 315 comprise nylon 66. In other implementations, the windings 315 may comprise other materials. As will be described hereafter, in some implementations, portions of the layer of windings 315 can be translucent or transparent.

Figure 2:
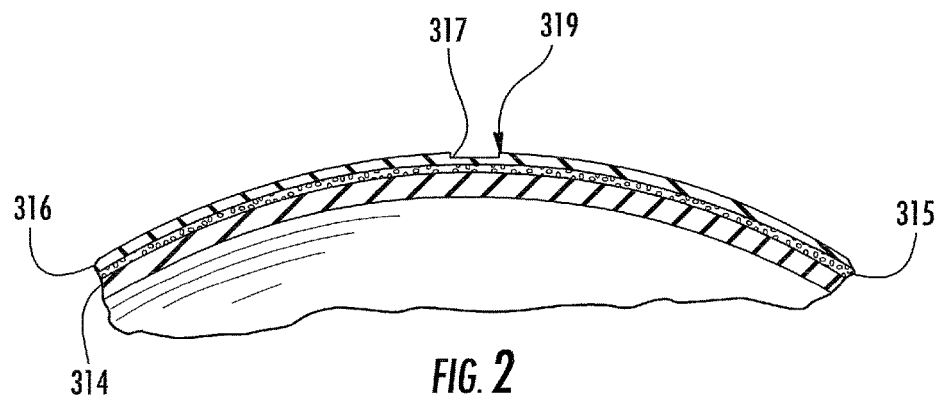
FIG. 2 is a fragmentary sectional view of a portion of one implementation of the ball of FIG. 1.

Cover 316 comprises a layer of elastic material over and about windings 315. In one implementation, cover 316 comprises a natural rubber, a butyl rubber, a sponge rubber or a combination thereof as described in U.S. Pat. No. 5,681,233. In one implementation, cover 316 is formed by laying panels or sheets of material over windings 315 and by molding or fusing the panels into a continuous integral unitary homogenous layer over windings 315. The cover 316 can also be referred to as the outer layer of the carcass of the basketball. In another implementation, cover 316 formed by injection molding or other fabrication techniques. As shown by FIG. 2, in one implementation, during the formation of cover 316 by molding or melting, the exterior surface of cover 216 is molded are shaped to include valleys 317 defined by inner edges of cover 316. In one implementation in which cover 316 also serves as the exterior surface of basketball 310, the valleys 317 forming cover 316 provide grooves 319 (shown in FIG. 1) on the exterior of basketball 310 to facilitate gripping. In such an implementation where cover 316 serves as the exterior surface basketball 310, the exterior service of cover 316 may additionally have molded thereon outwardly projecting pebbles between valleys 317 and logo 322. In FIG. 52, the ball can also be referred to as a carcass, and the cover 316 can be the outer surface of the carcass.

Figure 3:
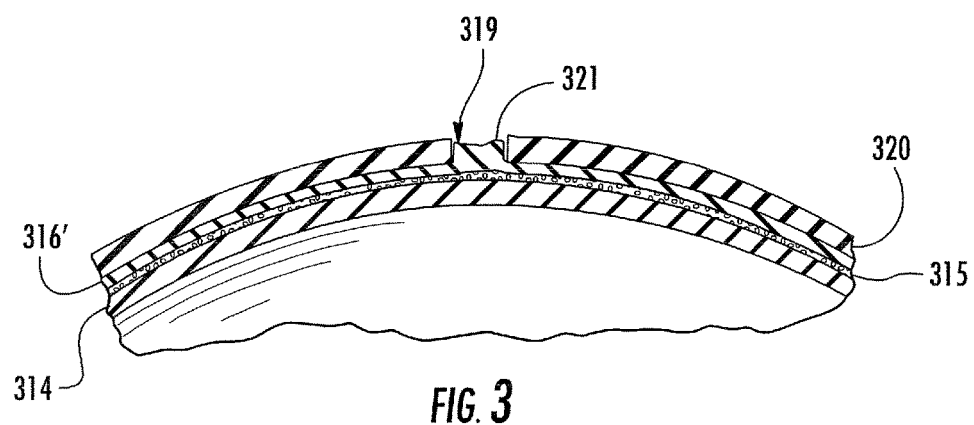
FIG. 3 is a fragmentary sectional view of a portion of another implementation of the ball of FIG. 1.

FIG. 3 is a sectional view of another implementation of basketball 310, wherein basketball 310 comprises cover 316' in lieu of cover 316 and additionally comprises outer cover panel 320. In the implementation of basketball 310 shown in FIG. 3, bladder 314, windings 315 and the alternative cover 316' serve as a carcass for supporting the outer cover panel 320 which provide a majority of the outer surface of basketball 310 shown in FIG. 1. Cover 316' is similar to cover 316 except that exterior surface of cover 316' is alternatively shaped or molded to include outwardly or radially projecting walls, ribs or dividers 321 in place of valleys 317. Dividers 321 partition the exterior of cover 316 into recesses, cavities or channels receiving outer cover panel 320. In such an implementation where outer cover panel 320 extend over cover 316', the formation of pebbles in cover 316' may be omitted. As with cover 316, portions of cover 316' are translucent or transparent in some implementations. In one implementation, those portions of cover 316 forming one or more of dividers 321 are transparent or translucent to allow light to pass through dividers 321 while other portions of cover 316 are opaque or have different light transmissive properties.

Outer cover panel 320 comprises panels of material secured within the channels or cavities formed by dividers 321 along an exterior of basketball 310. In one implementation, cover panel 320 is formed from materials such as leather, synthetic leather, polyurethane, rubber, other polymers and the like. In one implementation, the exterior surface of such cover panels 320 includes a pebbled texture. Each cover panel may additionally comprise the fabric backing coated with an adhesive prior to being secured to cover 316 which may also be alternatively coated with an adhesive. In some implementations, at least portions of one or more of cover panel 320 are translucent or transparent.

Figure 4:
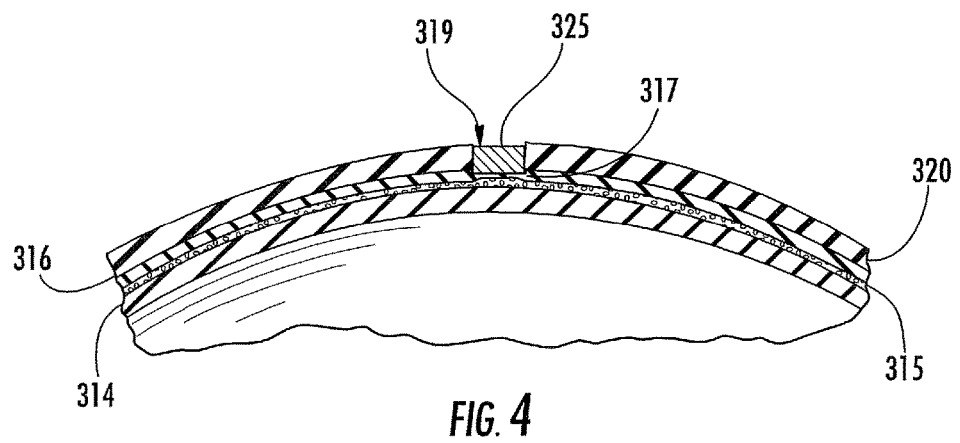
FIG. 4 is a fragmentary sectional view of a portion of another implementation of the ball of FIG. 1.

FIG. 4 is a sectional view of yet another implementation of basketball 310, wherein basketball 310 is similar to the basketball shown in FIG. 3, but additionally comprises outer cover panels 320 and strips 325. In the implementation of basketball 310 shown in FIG. 4, bladder 314, windings 315 and cover 316 serve as a carcass for supporting the outer cover panels 320 and strips 325 which provide the outer surface of basketball 310 shown in FIG. 1.

Strips 325 comprise elongate bands, tubes, cords or the like secured within valleys 317 and extending between and along adjacent opposite sides of cover panel 320. The material of strips 325 has good grip-ability and a relatively high coefficient of friction. In one implementation, the material of the strips 325 is chosen to match grip and feel of cover panels 320 so that the grooves 319 of the basketball 310 do not include areas of reduced grip-ability on the surface of basketball 310. The color of the material of strips 325 can contrast the color of the cover panel 320 provide visible evidence of grooves 319. One implementation, strips 325 are black. In one implementation, strips 325 comprise urethane-coated microfiber having a thickness of about 1.5 mm. In one implementation, the bottom of such strips 325 is coated with adhesive so as to adhere to cover 316 (or carcass) during a final molding step. In one implementation, the material strips 325 can be translucent or transparent.

As shown by FIG. 1, basketball 310 additionally comprises a valve assembly 322 secured to an exterior bladder 314 (shown in FIG. 2-4) and terminating at an inflation tube 323 which extends from the valve assembly 322 through cover 316 and through cover panels 320 (if provided as seen in FIGS. 3 and 4). The valve assembly 322 is configured to allow air to enter the bladder through use of an inflation needle (not shown) and, when removed, retain the air within the bladder 314.

Referring to FIG. 1, an electronic chip 318 is shown in association with the basketball 310. The electronic chip 318 is configured to actively transmit one or more electronic signals used to indicate the location, movement, speed, acceleration, deceleration, rotation and/or temperature of the basketball. Alternatively, the electronic chip 18 can include a passive circuit that allows for the detection of the location, movement, speed, acceleration, deceleration, rotation and/or temperature of the basketball to be ascertained when subjected to a magnetic field or other sensing system. The electronic chip 18 has a weight of less than 1 ounce, and more preferably, a weight of less than 0.5 ounce.

FIG. 1A schematically illustrates one example of electronic chip 318. As shown by FIG. 36A, in one implementation, electronic chip 318 is similar to electronic chip 18 in that electronic chip 318 comprises a substrate 120, battery 122, timer 123, light emitters 324A, 324B, 324C (collectively referred to as light emitters 324), sound emitter 326, motion sensor 328, pressure sensor 330, location sensor 331, gripping sensor 332, transmitter 133, and controller 334. Substrate 120 comprises a chip, platform or panel to support one or more of battery 122, light emitters 324, sound emitter 326, light sensors 127, motion sensor 328, pressure sensor 330, transmitter 133 and controller 334. In one implementation, substrate 120 includes several distinct portions which collectively support the aforementioned components. In one implementation, one or more of such components are supported independent of substrate 120. For example, in one implementation, controller 334 may be supported by chip 318, wherein light emitters 324 are supported by different structures at different locations within or throughout basketball 310.

Battery 122 comprises an energy storage device with supplies electrical power to at least light emitters 124 or other electronic components. In one implementation, battery 122 comprises one or more rechargeable electrical storage devices, such as one or more capacitors, supported by substrate 120 and in electrical connection with light emitters 124, either directly through one or more electrical wires or traces or through controller 134. In another implementation, battery 122 may comprise a battery that is not rechargeable. In one implementation, battery 122 comprises a removable disposable battery supported independent of substrate 120 and electrically connected to one or more components supported by substrate 120.

Timer 123 comprises one or more devices that track the passage of time. In one implementation, timer 123 comprises timer circuitry which electronically or digitally tracks time. Although illustrated as being supported by substrate 120, in other implementations, timer 123 may comprise a separate component provided as part of basketball 310, but in communication with circuit chip 18. In one implementation, timer 123 may be manually or automatically synced with other timers associated with a basketball game, scrimmage, practice or the like. In some implementations, timer 123 may serve as the main or sole timer for a basketball game. In some implementations, timer 123 functions similar to a stopwatch, being started and stopped in response to signals received through transceiver 133 or in response to sensed inputs received through grip sensor 332. As will be described hereafter, signals from timer 123 or times indicated by timer 123 may be used by controller 334 as a basis for adjusting lighting characteristics of light emitters 324 or output by sound emitter 326. In some implementations, timer 123 may be omitted.

Light emitters 324 comprise devices configured to emit visible light or electromagnetic radiation, wherein the emitted visible illuminates portions of basketball 310. In one implementation, light emitters 324 are supported by substrate 128 and comprise lighting elements such as light emitting diodes. In other implementations, light emitters 324 comprise other light emitting elements using other light emitting technologies. Although basketball 310 is illustrated as including three distinct light emitters 324, in other implementations, basketball 310 may include a greater or fewer of such light emitters 324. Although illustrated as being supported on support substrate 120, in other implementations, light emitters 324 may be supported distinct from substrate 120, such as along an electrical wire, an electrical trace or an electrical string supported elsewhere by basketball 310.

In the example illustrated, each of light emitters 324 is configured to emit a different wavelength or different color of visible light. For example, in one implementation, light emitter 324A emits a red light, light emitter 324B emits a green light and light emitter 324C emits a blue light. In one implementation, light emitters 324 generate different colors of light. In another implementation, light emitters 324 generate a white light, wherein each of light emitted from 324 includes a different filter such that each light emitter 324 emits a different color of light as a result of the different filters. In one implementation, one of light emitters 324 includes a diffusion covering which diffuses the generated light to illuminate an expansive area basketball 310. In one implementation, one of light emitters 324 includes a light focusing or concentrating covering which focuses the generated light onto a distinct predefined exterior portion of basketball 310.

In one implementation, one or more of light emitters 324 may additionally be configured to emit light in a controlled fashion. For example, light emitters 324 may emit light in a continuous fashion when on or in intermittent or flashing fashion when on. In one implementation, the frequency of the light emitted by light emitters 324 is fixed, wherein different light emitters 324 emit light at different frequencies. In one implementation, the frequency of light emitted by light emitters 324 is adjustable and is under the control of controller 334.

In various implementations, selected portions of basketball 310 are formed from materials to facilitate the transmission of light generated by the one or more of light emitters 324. For example, in one implementation, light emitters 324 are supported within a central portion or interior of basketball 310, within bladder 314. In such an implementation, at least portions of bladder 314 are formed from one or more materials so as to be translucent or transparent to the light emitted by light emitters 324. In one implementation, the entirety of bladder 314 or substantially and entirety of bladder 314 is translucent or transparent. In another implementation, selected portions of bladder 314 are translucent or transparent.

In yet other implementations, one or more of light emitters 324 are configured to emit a display of images or text using light. For example, in one implementation, one or more of light emitters 324 comprise a liquid crystal display receipt of protected within basketball 310, but viewable through translucent or transparent portions of basketball 310. In one implementation, one or more of light emitters 324 comprise part of an array of organic light emitting diodes (OLEDs) to provide a flexible display within or near a surface of basketball 310. In such implementations where one or more of light emitters 324 may display or directly present information, graphics and text may be presented on basketball 310. Information may be directly communicated instead of indirectly communicating information through the use of colors, intensities, and pulse frequency and duration. In yet other implementations, one or more of light emitters 324 may comprise other display technologies.

In such implementations where light emitters 324 are supported within an interior basketball 310 defined by bladder 314, at least portions of which are translucent or transparent, portions of windings 315, cover 316 (and panels 320) are also at least partially formed from one or more translucent or transparent materials. As a result bladder 14, winding 315, cover 316 and optional cover panel 320 allow light emitted by light emitters 324 to pass there through. In one implementation, the entirety of basketball 310 is translucent or transparent.

In another implementation, selected portions of basketball 310 are translucent or transparent. In one implementation, the carcass formed by bladder 314, winding 315 and cover 316 are translucent while particular panels 321 are translucent or transparent and other of panels 321 are not translucent or transparent. In one implementation, the layers of materials along grooves 319 are translucent or transparent such that light is only committed through such grooves 319 or such that the light seen along such grooves 319 has different characteristics, such as a different color or different brightness, as compared to light passing through other portions of basketball 310. The illumination of individual covers or grooves 319 visibly indicate rotation of basketball 310.

In another implementation, stylized portions of basketball 310 are translucent or transparent while adjacent portions of basketball 310 are opaque, blocking light. As a result, when light emitters 324 are emitting light, the stylized portions are emphasized and highlighted. In the example illustrated, basketball 310 includes a stylized portion shown as a logo 322 of alpha-numeric characters. In one implementation, logo 322 is translucent or transparent while adjacent portions adjacent to logo 322 are not translucent or transparent. In other implementations, basketball 310 may be provided with other stylized portions which are translucent or transparent while surrounding adjacent portions are opaque. Such stylized portions may be in the form of other logos, designs, graphics, phrases and the like. In one implementation, portions of basketball 310 adjacent to logo 322 may also be translucent or transparent, wherein those portions of basketball 310 adjacent logo 322 have a different degree, level or light transmissive characteristic as compared to the surrounding portions. For example, logo 322 and adjacent portions of best will 310 may transmit light to different degrees or may change the color or wavelength of the light differently as compared to one another.

In each of the aforementioned implementations, light emitters 324 may alternatively be supported external to bladder 314, between bladder 314 and the exterior of basketball 310. In such implementations, light emitters may be supported adjacent or in near vicinity to those particular portions of basketball 310 which are translucent or transparent. In some implementations, light emitters 324 are supported directly along the exterior surface of basketball 310 or within and interior portion of basketball 310, wherein at least portions of basketball 310 outside of the light emitter are translucent or transparent.

In one implementation, the outermost surface of basketball 310 (whether it be cover 316 as shown in FIG. 2 or panel 320 is shown in FIGS. 3 and 54) is formed therein with a depressed or recessed portion 336 in the shape of the stylized portion or logo. In such an implementation, basketball 310 can additionally comprise light emitter 324D and protective overlay 337. Light emitter 324D comprises a patch or substrate, also in the shape of the stylized portion and the shape of recessed 336, that supports a plurality of light emitting points such as a plurality of light emitting diodes or other individual light emitters. Light emitter 324D is secured within recess 336 and receives power from battery 122 under the control of controller 334. Protective overlay 337 although the shape corresponding to the stylized shaped recess 336 and is secured within recess 336 over light emitter 324D to protect light emitter 324D. In other implementations, recess 336, light emitter 324D and overlay 337 have different shapes and may have shapes different than one another. In some implementations, light emitter 324D can be formed as a string of lights simply deposited or secured within recess 336 without the underlying substrate support. Another implementation, overlay 337 may be omitted, wherein light emitter 324D is coated with a protective layer or is otherwise sufficiently durable to withstand wear during use of basketball 310.

In some implementations, light emitters 324 may be supported at different locations in or with respect to basketball 310. For example, in one implementation, light emitter 324A is supported along grooves 319, light emitter 324B is supported within an interior of bladder 14 and light emitter 324C is supported between bladder 314 and the exterior of basketball 310 at a particular region of basketball 310, such as adjacent to stylized portion 322. For example, light emitter 324A may comprise a string of light emitters extending along one or more of grooves 319. As noted above, the different light emitters may output or emit light in different fashions with respect to one another depending upon location of such light emitters. For example, in one implementation, grooves 319 may be more brightly illuminated as compared to cover panels 320 or stylized portion 322, providing enhanced illumination of basketball 310 and highlighting rotation of basketball 310. Logo 22 may be illuminated with a different color as compared to cover panels 320 or grooves 319. In one implementation, one or more of cover panels 320, grooves 319 or stylized portion 322 may be illuminated at different frequencies (continuous or intermittent). For example, grooves 319 may be intermittently illuminated at a first frequency, cover panels 320 may be intermittently illuminated at a second different frequency and stylized portion 322 may be continuously illuminated. By intermittently illuminating a selected portion or portions of basketball 310 or providing such portions with a lower level of illumination, battery power may be conserved. Moreover, by intermittently illuminating selected portions of basketball 310 or providing such portions with a lower level of illumination as compared to other portions, distractive impacts occurring when certain portions of basketball 310 are illuminated may be avoided or reduced.

Sound emitter 326 comprises a device, such as a speaker, to emit auditable sounds in response to control signals from controller 334. In one implementation, sound emitter 326 emits beeps. In another implementation, sound emitter 326 emits speech or words. For example, in one implementation, sound emitter 326 may emit a beep or predefined series or pattern of beeps in response to a particular characteristic detected by either motion sensor 328 or pressure sensor 130, or in response to signals received via transceiver 133. In another implementation, sound emitter 326 may emit words, such as words of status, such as a number indicating a rotational speed of basketball 310, words of encouragement such as "nice shot" or words of instruction such as "change grip", "increase backspin", or "inflate" in response to a control signals from controller 334 based upon sensed values from motion sensor 328, pressure sensor 130, location sensor 331, or in response to signals received via transceiver 133. In some implementations, sound emitter 326 is omitted from basketball 310, wherein sounds are not generated or wherein separate and distinct sound emitters outside of basketball 310 and remote from basketball 310 are utilized to emit sounds in response to signals transmitted by basketball 310.

Light sensors 127 comprise one or more light sensors that detect ambient lighting with respect to basketball 310. The detected lighting is transmitted to controller 334. One implementation, light sensors 127 may be located or supported along the exterior surface of basketball 310. In other implementations, light sensors 127 may be embedded below external surface of basketball 310, wherein overlying portions are transparent or translucent. Ambient lighting conditions detected by light sensors 127 are communicated to controller 334 for controlling an on-off-state of light emitters 324 or for adjusting the brightness of light provided by light emitters 324. In some implementations, light sensors 127 may be omitted.

Motion sensor 328 comprises one or more sensors to detect motion of basketball 310. In one implementation, sensor 328 comprises an accelerometer, such as a dual axis accelerometer. In one implementation, sensor 328 comprises a sensor to detect 6 degrees of freedom or motion. In another implementation, sensor 328 can be comprised with a sensor to detect 9 degrees including linear movement, rotational movement, and movement with respect to polar axes and the ground (gravity). Conditions detected by sensor 328 are transmitted to controller 334. Signals from motion sensor 328 may indicate a rotation or spin of basketball 310, its travel arc, arc height and the like.

Pressure sensor 130 comprises one or more sensors to detect an internal pressure within bladder 314. One implementation, sensor 130 comprises a pneumatic sensor that detects air pressure changes within bladder 314. The sensor 130 can be used to monitor air pressure within the bladder 314 and serve to activate the electronic circuit when a pressure fluctuation is sensed. In this manner, the sensor 130 can be used as part of the control logic of the electronic chip 318 to maximize available battery life of the electronic sensor and/or circuit. The electronic chip 318 can include shutdown logic that places the electronics of the electronic chip 318 into a standby or sleep mode until the basketball 310 is put into play. When the basketball 310 is moved, passed, kicked or punted, the air pressure within the basketball 310 can fluctuate or change. This change in air pressure is sensed by the sensor 130, which then activates the electronic chip 318 and places it in an operating mode. In an alternative example implementation, the sensor 130 can be a piezoelectric sensor The air pressure sensor 130 can also be used to indicate the air pressure within the bladder 314 and therefore the pressure of the basketball 310 itself. The signal produced through the sensor 130 and from the electronic chip 18 can be used to confirm that the air pressure is within a desired range or at a specific desired setting. For example, NBA basketballs have a recommended air pressure of 9.5 psi. If the game balls have the pressure sensor 130, one could use this information to select the most properly inflated basketball. The electronic chip 18 can also include a temperature sensor for monitoring the temperature of the basketball 310. In some implementations, pressure sensor 130 is omitted.

Location sensor 331 comprises one or more sensors to detect a location of basketball 310. In one implementation, location sensor 331 comprises a global positioning system (GPS) sensor/receiver. In another implementation, location sensor 331 may additionally or alternatively comprise a magnetometer which sensors magnetic fields or polar magnetic fields to determine a location or position of basketball 310

In one implementation, the user is instructed to stand at the approximate distance from a ferromagnetic basketball rim or other ferromagnetic reference structure. The user indicates where he or she is located or distance from the ferromagnetic reference structure. The user is then instructed to shoot the basket towards the ferromagnetic reference structure. The system uses the first location as a reference point and the first shot as reference throw (alternatively, the user can also indicate where the ferromagnetic reference structure is located). With the reference shot, the system knows when it reaches the reference structure (the magnetometer senses the polar magnetic field, but also field from the metallic reference structure). The ferromagnetic reference structure creates the equivalent of some noise or alters the polar magnetic force slightly.

Once the system knows the initial shot position. It knows that the user was facing the reference structure at a known distance feet away, and that the user was directly in front of the reference structure. The location and shot are subsequently utilized as a reference. Then, with all subsequent positions for basketball 310, such references are used to determine subsequent locations of the basketball. In one implementation, subsequent shots are analyzed using 6 degree of freedom sensors (one sensor covers 3 directions of ball movement with respect to the x, y and z axes, the second sensor is referencing gravitational pull with respect to the x, y and z axes, and the distance to the ground, and the magnetometer measures the strength of the magnetic field to know where it is in relation to north) and the magnetometer. In some implementations, one or more of motion sensor 328, position sensor 330, or location sensor 331 are omitted.

Grip sensor 332 comprises one or more sensors located in or on basketball 310 to detect manual gripping of basketball 310. For example, in one implementation, grip sensors 332 comprise pressure, contact other types of sensors on the surface of or within grooves 18. Such sensors provide electrical signals to chip 218 and controller 334 indicating that basketball 310 is being manually gripped along grooves 18 or how grooves 18 are currently being contacted or gripped by a person's hand. In other implementations, gripping sensors 332 may be omitted.

Transceiver 133 comprises a device to transmit and receive signals with respect to a device distinct from basketball 310. In one implementation, transceiver 133 facilitates communication between controller 134 and a local or wide area network such as a phone network or the Internet. In one implementation, transceiver 133 additionally or alternatively facilitates communication between controller 134 and a portable electronic device, such as a cell phone, a smart phone, a flash player, a personal data assistant, a notebook, netbook or laptop computer or the like. Such communication may comprise the transmission of selections or commands to controller 334 and basketball 310 or the output of data from basketball 310 for remote or external analysis, storage and visual or graphical representation. In one implementation, transceiver 133 may comprise a Bluetooth transceiver. In another implementation, transceiver 133 may comprise a radiofrequency transceiver. In some implementations, transceiver 133 may be omitted.

Controller 334 comprises one or more integrated circuits or processing units to generate control signals directing the operation of light emitters 324 and sound emitter 326 based upon information received from sensors 127, 328, 330, 331, 332 and control or data signals received through transceiver 133. In one implementation, controller 334 generates control signals that control the emission of light by light emitters 324.

According to a first mode of operation, controller 334 actuates light emitters 324A from an off state to an on state in response to control inputs from a person to illuminate basketball 310 as desired in lowlight conditions. For example, in response to receiving inputs through grip sensors 332, controller 334 may turn on light emitters 324A. In another implementation, controller 334 generates control signals for light emitters 324A in response to her based upon signals received from light sensors 127 to provide overall lighting for basketball 310. For example, in response to receiving signals from light sensor 127 indicating that ambient lighting or environmental lighting has fallen below a predefined threshold, controller 334 may generate control signals turning on light emitters 324A. In some implementations, in response to receiving signals from light sensors 127, controller 334 may actuate light emitters 324A between one of multiple different lighting levels. For example, as ambient lighting darkens below each of a series of thresholds, controller 334 may generate control signals increasing the brightness or intensity of light being emitted by light emitters 324A in a stepwise or continuous fashion. This may be achieved by increasing the wattage of the light being emitted or by increasing the number of light emitting diodes or other lighting elements that are providing light. Similar adjustments to the brightness or intensity of light being emitted by any of the light emitters of basketball 310 may made by controller 334 based upon the sensed a detected ambient lighting conditions. As ambient lighting conditions become darker, controller 334 may generate control signals causing the light emitted by any of the various light emitters of basketball 310 to be brighter.

In one implementation, controller 334 generates control signals causing light emitter 324A to turn on and emit light in response to signals from motion sensor 328 indicating motion of basketball 310 satisfying a predefined criteria or threshold. For example, in one implementation, controller 334 generates control signals causing light emitter 324A (or additional light emitters 324) to begin to emit light during a basketball shot or free-throw when basketball 310 is rotating about its axis above a predefined minimum velocity or backspin.

In one implementation, controller 334 first determines whether basketball 310 is being shot, such as during a field goal attempt or during a free-throw, versus when basketball 310 is merely being dribbled or passed. In one implementation, controller 334 determines whether travel of a ball is a shot or such travel is merely the ball being dribbled or being passed based upon whether the ball is traveling to a parabolic path having an arc that satisfies a predefined threshold. In another implementation, controller 334 determines whether travel of the ball is a shot or such travels merely indicates the ball being dribbled or being passed based upon a maximum height of the ball travel. For example, controller 334 may identify travel of the ball as a shot of the ball if controller 334 receives signals from motion sensor 328 or location sensor 331 indicating that the ball is above a height of the basketball rim or has a trajectory estimated by controller 334 to achieve a height above the basketball rim.

Once controller 334 has determined that the travel of the ball is a shot, versus a dribble or pass, controller 334 utilizes additional signals from motion sensor 328 to determine a rotational velocity and/or backspin of basketball 310. When the rotational velocity or backspin of basketball 310 falls below the predefined threshold, controller 334 terminates emission of light by light emitter 324A. For example, in one implementation, controller 334 may generate control signals causing light emitter 324A to emit light when the detected backspin from motion sensor 328 is greater than five RPMs.

In one implementation, controller 334 adjusts the non-zero emission of light by light emitter 324A dependent upon signals from motion sensor 328. For example, controller 334 may generate control signals causing light emitter 324A to increase an intensity of light being emitted as the speed of backspin increases. This light intensity adjustment may be made in a continuous ramped fashion or may be made in a stepwise fashion as predefined thresholds are satisfied.

In yet another implementation, controller 334 adjusts the frequency or duration of pulses of light emitted by light emitter 324A (and/or other light emitters 324) dependent upon the sensed motion of basketball 310. For example, controller 334 may generate control signals causing light emitter 324A to emit light pulses having a frequency or duration upon a predefined minimum rotational velocity being detected. In such an implementation, controller 334 may further generate control signals causing the intensity and/or duration of the light pulses to be increased as the rotational velocity or backspin of basketball 310 increases.

In one implementation, controller 334 generates control signals adjusting both the pulse frequency/duration and the light brightness or intensity to indicate different detected characteristics. For example, in one implementation, controller 334 may adjust or control the frequency/duration of the pulses based upon rotational velocity and the brightness or intensity of such pulses based upon a detected arc or parabolic path of basketball 310. In other implementations, controller 334 may adjust or control the frequency/duration of pulses based upon the detected arc of basketball 310 and the brightness or intensity of such pulses based upon rotational velocity or backspin.

In yet another implementation, controller 334 generates control signals controlling a color of light being emitted by light emitters 324 based upon detected motion of basketball 310. For example, controller 334 may cause light emitters 324 to emit a first color of light upon a predefined threshold for rotational velocity or backspin being satisfied and may cause light emitters 324 to emit different colors of light as different rotational velocity or backspin thresholds are satisfied. Similarly, in another implementation, controller 334 may cause light emitters 124 to emit a first color of light upon a predefined threshold for art being satisfied and may cause light emitters 324 to emit different colors of light as different arc thresholds are satisfied or exceeded. In some implementations, each of light intensity/brightness, pulse duration/frequency and light color may be controlled and adjusted to indicate when each of different predefined motion thresholds (velocity, arc of travel and the like) are being satisfied.

In one implementation, controller 334 generates control signals causing light emitter 324B to differently emit light based upon signals received from pressure sensor 130. For example, in response to receiving signals from pressure sensor 130 indicating the internal pressure within bladder 314, controller 334 may generate control signals causing light emitter 324B to emit different colors of light dependent upon inflation level of bladder 314. Controller 334 may cause light emitter 324B to emit a red light when basketball 310 has a pressure below a predefined minimum to indicate basketball 310 being underinflated. Similarly, controller 334 may cause light emitter 324B to emit a green light when basketball 310 other pressure above the predefined minimum to indicate basketball 310 being appropriately inflated. In a similar fashion, controller 334 may alternatively control light intensity or pulse/duration characteristics to indicate inflation levels for bladder 314 and basketball 310.

In one implementation, controller 334 generates control signals causing light emitter 324C to differently emit light based upon a detective positioning of basketball 310, based at least partially upon signals received from location sensor 331. For example, controller 334 may generate control signals adjusting an on-off state, a light brightness, a color or a pulse frequency/duration dependent upon the momentary positioning of basketball 310 (horizontal distance or height) or traveling velocity of basketball 310. In one implementation, controller 134 generates control signals causing light emitter 324C to turn on and emit light for a predefined period of time when signals from location sensor 331 indicate that basketball 310 has satisfied a predetermined location threshold, such as when basketball 310 has passed through the rim/hoop. In another implementation, controller 134 generates control signals causing the light emitted by light emitter 124C to change in brightness, color or pulse frequency/duration, for a predetermined time period, after such location thresholds have been satisfied. For example, based upon signals received from motion sensor 328 and motion of basketball 310, controller 334 may determine the initiation of a shot. If during the play or down, controller 334 further receives signals from location sensor 331 indicating that basketball 310 has traveled through the hoop or rim, controller 334 may generate control signals causing basketball 310 (or portions of basketball 310) to change from a darkened to an illuminated state, to change from a continuous illumination to a flashing illumination, to change from a first color to a second color or to change from a first brightness to a second brightness, or combinations thereof.

In yet other implementations, controller 334 may include an internal timer or may receive signals from transducer 133 indicating time periods associated with the game being played. Based upon such signals, controller 334 generates control signals adjusting illumination provided by one or more of light emitters 324. For example, in one implementation, controller 334 generates control signals adjusting illumination provided by light emitter 324B based upon shot clock timing. For example, controller 334 may change the color of light being an emitted from one or more portions of basketball 310 as an end of a shot clock period is approaching. In another implementation, controller 334 may adjust a frequency or duration a light pulses being emitted by basketball 310 as an end of a shot clock time period approaches. Similar adjustments may be made by controller 334 based upon time allotments for inbounding a basketball or based upon approaching end of a quarter or half. In yet other implementations, controller 334 may additionally or alternatively generate control signals making light adjustments that indicate the actual end of a time period, such as the end of a shot clock time period or the end of a quarter or half. In such an implementation, basketball 310 may be utilized to provide shot clock timing, ball possession limitations or game timing for informal basketball games at playgrounds or other basketball court facilities where shot clock or game clocks may not be available. In such an implementation, controller 334 may receive inputs through transceiver 133 or through contact sensors on ball 310 establishing a custom shot clock time period or game. For such informal basketball games.

In some implementations, controller 134 may adjust lighting characteristics of basketball 310 based upon a comparison of detected motion or travel of basketball 310 (as determined using signals from motion sensor 328, pressure sensor 330 and location sensor 331) with stored or obtained ball travel results achieved by a celebrity. For purposes of this disclosure, a "celebrity" shall mean a person who has attained notoriety for his or her performance in the sport. Examples of such celebrities include college and professional basketball players. Although controller 334 may include a memory serving as a celebrity storage for storing user data pertaining to travel of the ball, in other implementations, controller 334 may obtain celebrity ball travel characteristics or results from a remote location using transceiver 133. For example, celebrity ball travel results are characteristics may be alternatively provided at a remote server which may be accessed across a local or wide area network.

Based upon signals received from one or more of motion sensor 328, pressure sensor 330 and location sensor 331, compares a person's results with that of a celebrity and adjust lighting characteristics of basketball 310 accordingly. For example, in one implementation, controller 334 may compare detected parameters or characteristics of a user's backspin and/or arc of a basketball with a celebrity's shot of the basketball. For example, controller 334 may compare of a user's basketball shot with the basketball shot by a popular basketball celebrity such as Lebron James of the Miami Heat or former player Michael Jordan of the Chicago Bulls. Based upon this comparison, controller 334 generates control signals causing one or more lighting characteristics of basketball 310 to be adjusted. For example, if a particular basketball shot by user has characteristics that satisfy predefined thresholds typical of a celebrity college or professional basketball player, controller 334 may change the color of light being emitted by basketball 310 during the basketball shot and/or for a predetermined period of time following the basketball shot, providing a user with a reward or complement and encouragement. In such an implementation, controller 334 and the light being emitted by basketball 310 provide a user with a motivational tool by allowing the user to visually determine or see how his or her individual parameters pertaining to travel of the basketball compare to the same individual parameters of a celebrity having above-average skills in the sport. Similar implementations may be made with respect to other aspects such as free throws.

In some implementations, controller 334 stores and keeps track of results, wherein controller 334 adjusts lighting characteristics of basketball 310 as different predetermined thresholds or milestones are met. For example, in one implementation, controller 334 tracks free-throw makes versus attempts, wherein controller 334 generates different control signals causing basketball 310 to emit a different characteristic light (such as a different color, frequency, brightness etc.) based upon the current free-throw percentage of a person using basketball 310. For example, when a player achieves a free-throw percentage of at least 50%, controller 334 generates control signals causing a first color light to be emitted by basketball 310 and when the player achieves a second greater free-throw percentage of say, at least, 60%, controller 334 generates control signals causing a second different color light to be emitted by basketball 310. If a player's free-throw percentage falls below a predefined threshold, controller 334 generate control signals once again changing the color of light emitted by basketball 310. In such an implementation, the color, pulse frequency, brightness etc. of basketball 310 provides the player with a visual motivational tool. In some implementations, the visible color may further indicate to others, such as a player's coach, the current free-throw percentage, offering additional opportunities for encouragement. In addition to tracking free throw percentages, controller 334 may be configured to track and adjust lighting characteristics based upon other statistics such as three point shot percentage and two point shot/field goal percentages. In other implementations, instead of producing or varying the emission of light, the controller 334 can send signals to a remote electronic device for tracking all of the above-listed characteristics.

In one implementation, transceiver 133 is configured to read or receive player identification signals, wherein controller 334 associates and stores data for multiple players in a game or practice. For example, in one implementation, each of multiple players may include a distinct radio frequency identification (RFID) tag. Transceiver 133 or another RFID reading device provided as part of basketball 310 is configured to read the particular player RFID tag when the particular player is currently handling basketball 310. If the particular player shoots the basketball, data such as make/ miss, backspin, arc and the like, sensed by one or more sensors of basketball 310, is stored in a memory on chip 318. Such data may be subsequently transmitted by transceiver 133 to an external or remote portable electronic device for further statistical analysis and visual representation. As a result, basketball 310 allows individual players in a practice or an informal pickup game to later view their statistics (shot attempts, field-goal percentage, three-point shots, free-throw percentage, shot mapping) on their portable electronic devices, on a website or computer.

In some implementations, basketball 310 may have dedicated portions of cover 12 which are translucent or transparent for outwardly transmitting light indicative of different sensed parameter characteristics. For example, in one implementation, basketball 310 may have a translucent or transparent portion dedicated for transmitting light indicating the current pressure level of bladder 314 of basketball 310. For example, logo 322 may be translucent or transparent so as to transmit light by light emitter 324B indicating a current pressure within bladder 314, wherein other transparent or translucent portions of basketball 310 do not emit light from light emitter 324B indicating pressure, but emit light from other light emitters 324 to provide other information. Similarly, other particular portions of the basketball 310 may be dedicated to present particular predefined information. For example, in one implementation, grooves 319 may transmit light from a light emitter 324A indicating rotational velocity or spiral efficiency.

In one implementation, controller 134 additionally controls one or more light emitters 324 based upon signals received from grip sensor 332. In one implementation, in response to receiving signals indicating that grooves 18 are being manually contacted or gripped, controller 334 actuates one or more of sensors 328, 330, 331 from a standby or sleep mode or state to an active state, effectively turning on several the functions of basketball 310. In such an implementation, battery power is conserved. In one implementation, in response to receiving signals indicating grooves 319 are no longer being manually contacted or gripped, controller 334 initiates or begins countdown of a timer counting down to termination of lighting of one or more of light emitters 324. In such an implementation, after prolonged periods of nonuse or undetected gripping of grooves 18 or other portions of basketball 310, light emitters 324 are turned off to conserve power.

In yet other implementations, controller 334 may utilize signals received from grip sensor 332 for receiving input, commands or selections. For example, grip sensor 332 may comprise a plurality of individual pressure or contact sensors, wherein different combinations of touches (as detected by pressure or contact) correspond to different commands or selections. In one implementation, controller 334 may offer a person with a variety of selectable options or settings such as options as to predefined sets of settings based upon a person's current skill level (beginner, amateur, high school, college, professional), wherein a person may select one of the set of settings by contacting grooves 319 in a predefined manner at predefined locations or in a predefined order during a setup phase. In another implementation, controller 134 may offer a person with a variety of selectable options or settings as to how information is communicated (if at all) through light emitters 324 or sound emitter 326, whether through changes in on-off states, color, duration, pulse frequency or duration, sound and the like, wherein a person may select one or more of the communication options by contacting laces 16 in a predefined matter at predefined locations or in a predefined order during a setup phase. In another implementation, controller 334 may alternatively or additionally offer a person with a variety of selectable officer settings as to what portions of basketball 310 are illuminated or as to what portion of basketball 310 is assigned to communicating particular information through illumination, wherein a person may select one or more of the basketball portion illumination options by contacting grooves 319 or logo 322 in a predefined matter at predefined locations or in a predefined order during a setup phase. For example, by contacting logo 322 in a first particular manner during a setup phase, a person may establish a first setting wherein grooves 319 communicate backspin and logo 22 communicates shot clock information through illumination and by contacting logo 322 in a second different particular manner during a setup phase, a person may establish a second setting wherein lighting of grooves 319 communicate shot clock information while logo 22 communicates backspin or arc information through illumination. In such implementations, once selections or commands are made, controller 334 may generate control signals causing light emitters 324 or sound emitter 326 to confirm the selection using illumination or sound.

Transceiver 133 comprises a device to transmit and receive communication signals. In one implementation, transceiver 133 is configured to facilitate communication between controller 334 and an external electronic device. In one implementation, transceiver 133 is configured to facilitate communication between controller 334 and a portable electronic device, such as a smart phone, cellular phone, personal data assistant, notebook, tablet computer, laptop computer, flash memory player (IPOD) and the like using radiofrequency (RF) waves, radio waves, Bluetooth, Wi-Fi, near field communication and the like. In one implementation, controller 334 utilizes transceiver 133 to communicate with a portable electronic device so as to allow a person to receive data or information regarding basketball 310 and to further potentially store such information for later review or analysis. For example, controller 334 may utilize transceiver 133 to communicate information pertaining to motion of basketball 310 such as backspin or arc, inflated pressure of bladder 314 of basketball 310, the success of the free-throw or should shot, allowing correlation between motion of basketball 310 (such as backspin and/or arc) to success of a shot or free-throw.

In one implementation, controller 334 further utilizes transceiver 133 to additionally receive commands or settings. For example, in one implementation, controller 334 may offer a person with a variety of selectable options or settings such as options as to predefined sets of settings based upon a person's current skill level (beginner, amateur, high school, college, professional), wherein a person may select one of the set of settings using a portable electronic device which is in communication with controller 334 using transceiver 133. Each of the different skill levels may have different thresholds for triggering light characteristic adjustments or other characteristics by controller 334. In another implementation, controller 334 may offer a person with a variety of selectable options or settings as to how information is communicated (if at all) through light emitters 324 or sound emitter 326, whether through changes in on-off states, color, duration, pulse frequency or duration, sound and the like, wherein a person may select one or more of the communication options by communicating with controller 334 using transceiver 133 and a portable electronic device or another communication device. In another implementation, controller 334 may alternatively or additionally offer a person with a variety of selectable options are settings as to what portions of basketball 310 are illuminated or as to what portion of basketball 310 is assigned to communicating particular information through illumination, wherein a person may select one or more of the basketball portion illumination options by communicating to controller 334 using transceiver 133. For example, a person may establish a first setting wherein grooves 319 communicate backspin and logo 322 communicates inflation pressure through illumination and a second setting wherein grooves 319 communicate backspin while logo 322 communicates detected arc of a shot/free-throw through illumination. In such implementations, once selections or commands are made, controller 334 may generate control signals causing light emitters 324 or sound emitter 326 to confirm the selection using illumination or sound.

In other implementations, in lieu of communicating with external or remote electronic devices in a wireless fashion, transceiver 133 may alternatively facilitate communication using contact or induction. For example, transceiver 133 and alternatively to indicate using an RFID tag or through an electrical jack or plug. In one implementation, an electrical contact may be situated along or about inflation port 322 (or a separate independent port), allowing a jack or plug-in to be inserted into port 322 and into contact with the electrical contacts to facilitate "wired" communication with controller 334. In other implementations, transceiver 133 may be omitted.

Figure 5:
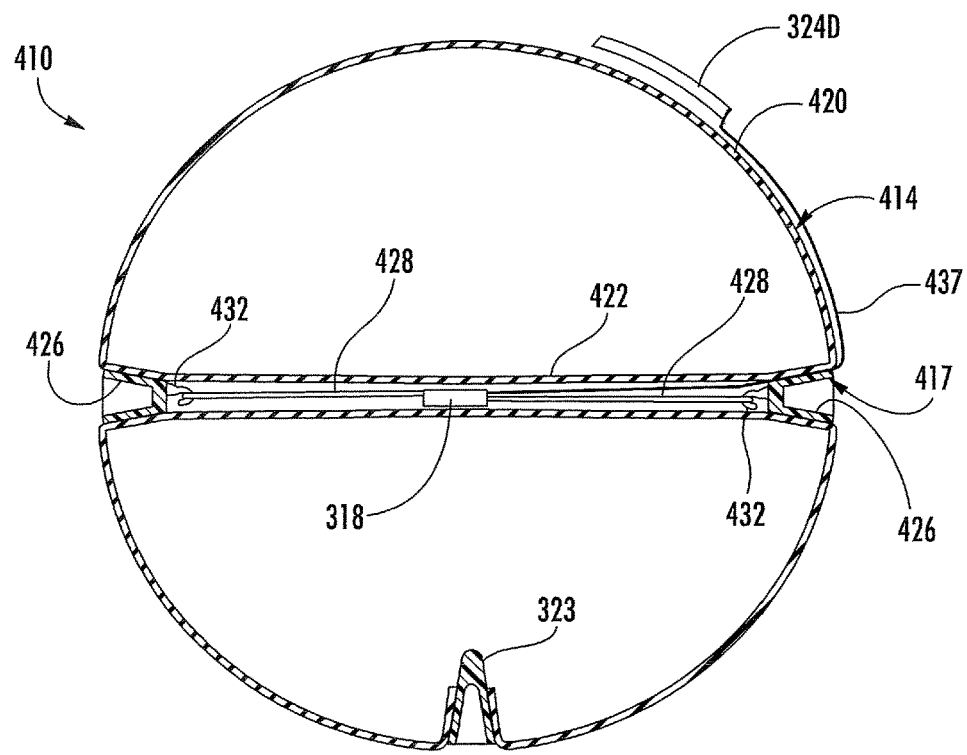
FIG. 5 is a sectional view of a portion of another implementation of the ball of FIG. 1.

FIG. 5 is a sectional view illustrating a portion of basketball 410, an example implementation of basketball 310. Basketball 410 is similar basketball 310 except that basketball 410 is illustrated as specifically including bladder 414 in lieu of bladder 314 and additionally comprises chip mounting system 417. Although not illustrated in FIG. 5, basketball 410 additionally comprises one of the basketball configurations shown in FIGS. 2-4.

Bladder 414 is similar to bladder 314 except the bladder 414 comprises a spherical inflatable outer wall 420 and an internal tubular portion 422. Internal tubular portion 422 comprises a flexible tubing extending through an intersecting a center point of basketball 410 and outer wall 420. As a result, outer wall 420 and tubular portion 422 form a donut-like inflatable interior which encircles tubular portion 422. Tubular portion 42 is sized receive electronic components, such as circuit chip 318 (described above). Tubular portion 422 facilitates insertion of circuit chip 318 within basketball 410 after bladder 414 has been inflated. As a result, in some implementations, the positioning of circuit chip 318 within basketball 410 may be performed after one or more of cover 316, 316" and panels 320 have been formed upon the inflated bladder 414. As a result, circuit chip 318 may avoid being subjected to substantially high temperatures during the forming of cover 316, 316" and panels 320. Because tubular portion 422 continuously extends from a first side of bladder 414 to a second opposite side of bladder 414, circuit chip 318 and chip mounting system 417 may be strong through bladder 414. In other implementations, tubular portion 422 may comprise a blind tubular member or a tubular member having one closed off end, wherein the closed off end is secured in place within bladder 414.

In implementations where circuit chip 318 comprises one or more of light emitters 324 such that light emitters 324 are located within tubular portion 422, those portions of tubular portion 422 about circuit chip 318 or adjacent to the one or more light emitters 324 are translucent or transparent. As a result, light emitted by such light emitters 324 a pass-through tubular portion 422 and illuminate the interior bladder 414, wherein at least portions of wall 420 of bladder 414 are also translucent or transparent. In implementations where light emitters 324 are omitted, tubular portion 422 may be opaque.

Chip mounting system 417 mounts and supports electronic component or chip 318 within bladder 414 and within tubular portion 422. Chip mounting system 417 comprises plugs 426 and flexible member 428. Plugs 426 are configured to be inserted and retained in opposite ends of tubular member 422 proximate an exterior of bladder 414. Plugs 426 are each connected to an opposite end of flexible member 428. In the example illustrated, each of plugs 426 comprises a hook 432 about which flexible member 428 extends. In other implementations, plugs 426 may be secured to flexible member 428 in other fashions.

Flexible member 428 comprises an elongate flexible string, line, band, strap, cable, rope, wire or the like extending between plugs 426. Flexible member 428 supports circuit chip 318 at a central location within tubular portion 422. In one implementation, flexible member 428 comprises a resiliently stretchable member, which when taught, resiliently holds circuit chip 318 in place. In other implementations, other structures which are not necessarily flexible or resilient may be positioned within tubular portion 422 to retain circuit chip 318 centrally in place within tubular portion 422. In some implementations, flexible member 428 may be omitted, wherein circuit chip 318 is positioned within tubular portion 422 and wherein, upon stretching of tubular portion 422, tubular portion 422 constricts about and into gripping contact with circuit chip 318 to retain circuit chip 318 in place.

In the example illustrated, chip mounting system 417 additionally comprises multi-lead wire 437. Multi-lead wire 437 extends from the electronic chip 318, through tubular portion 422, between tubular portion 422 and plug 426 and along an exterior of bladder 414 to light emitter 324D, any grip sensors 132, or other sensors. In one implementation, wire 437 extends along and in contact with exterior surface of bladder 414. In another implementation, wire 437 extends between any of the various layers between bladder 414 and outer cover 312 (shown in FIG. 1). Tubular portion 422 of bladder 414 facilitates location of light emitters 324, electronic chip 318, or other electronics at a central portion within basketball 410 and facilitates communication between chip 318 and other electronics, such as, for example, light emitter 324D and/or grip sensor 332, external to bladder 414, without wire 437 passing through wall of bladder 414. As a result, wire 437 is less likely to impair the structural integrity of bladder 414.

Figure 6:
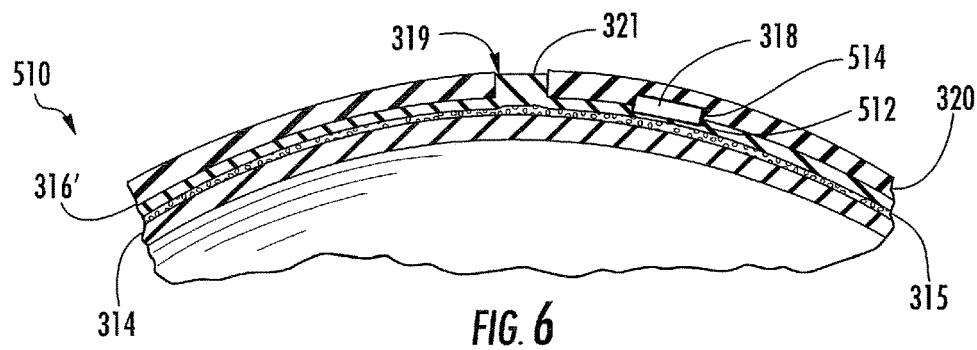
FIG. 6 is a fragmentary sectional view of a portion of another implementation of the ball of FIG. 1.

FIG. 6 is a sectional view illustrating basketball 510, another example implementation of basketball 310. Basketball 510 is similar to basketball 310 except that basketball 510 is specifically illustrated as having circuit chip 318 located external to bladder 314. In the example illustrated, circuit chip 318 is supported adjacent to windings 315 within recesses formed within cover 316' and cover panel 320. In some implementations, depending upon a thickness of cover 316' and cover 318, circuit chip 318 may be supported entirely within a recess of cover 316' or of cover panel 320. In one implementation, circuit chip 318 and light emitters 324 are located behind logo 322. In one implementation, light emitters 324 may illuminate an entire region of at least one of panels 320. In some implementations, the circuit chip 318 may be added to basketball 410, where basketball 40 comprises two circuit chips 318 or wherein basketball 40 comprises two separate light emitters at different locations, one light emitter centrally located within tubular portion 422 and another light emitter outwardly located between winding 315 and cover panel 320.

In one implementation, basketball 410 is formed by molding recess 512 within cover 316' and forming recess 514 in panel 320 such that circuit chip 318 is captured between cover 316' (or windings 315 where recess 512 extends completely through cover 316') and cover panel 320. In other implementations, circuit chip 318 may be secured adjacent to bladder 414, wherein windings 315 extend about and over circuit chip 318. In yet other implementations, circuit chip 318 and/or light emitters 324 may be secured at other locations.

Figure 7:
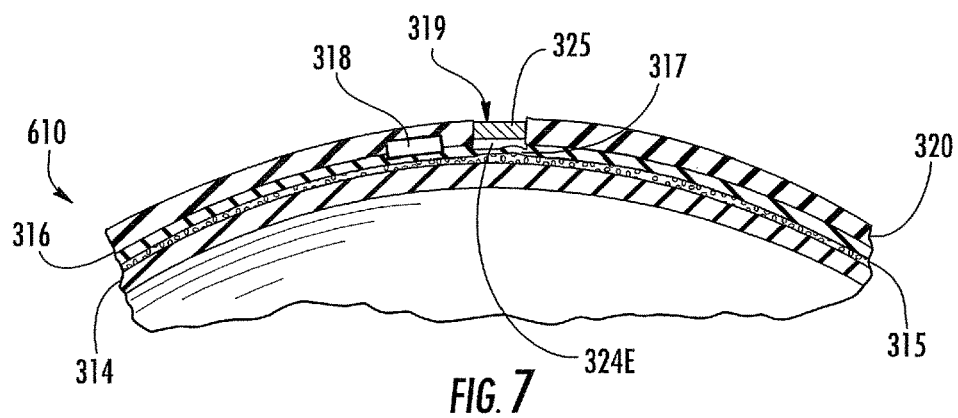
FIG. 7 is a fragmentary sectional view of a portion of another implementation of the ball of FIG. 1.

FIG. 7 is a sectional view illustrating basketball 610, another example implementation of basketball 310. Basketball 610 is similar to basketball 310 except that basketball 510 is specifically illustrated as having circuit chip 318 located external to cover 316 and is having a light emitter 324E within valley 317 below strip 325. In the example illustrated, circuit chip 318 is supported adjacent to cover panel 320 within recesses formed within cover panel 320. In one implementation, circuit chip 318 and light emitters 324 are located behind logo 322 (shown in FIG. 1).

Light emitter 324E comprises a device to emit light in response to control signals from controller 334 located on circuit chip 318. In the example illustrated, light emitter 324E is located within valley 317 (described above with respect to FIG. 1) below strip 325 so as to illuminate groove 318. In such an implementation, at least portions of strip 325 are translucent or transparent. In one implementation, light emitter 324E (schematically shown) comprises a string of multiple light emitting elements such as a string of light emitting diodes. Although basketball 610 is illustrated as including light emitter 324E in a single groove 318, light emitters may also be provided in other grooves 319 of basketball 610.

In some implementations, basketball 610 may additionally comprise the circuit chip 318 and chip mounting system 417 shown and described above with respect to FIG. 5. In such an implementation, light emitters provided on the centrally located circuit chip 318 within tubular portion 422 illuminates larger more expansive areas while light emitters located within groove 318 or adjacent to cover 320 may illuminate specific designated portions of basketball 610.

Figure 8:
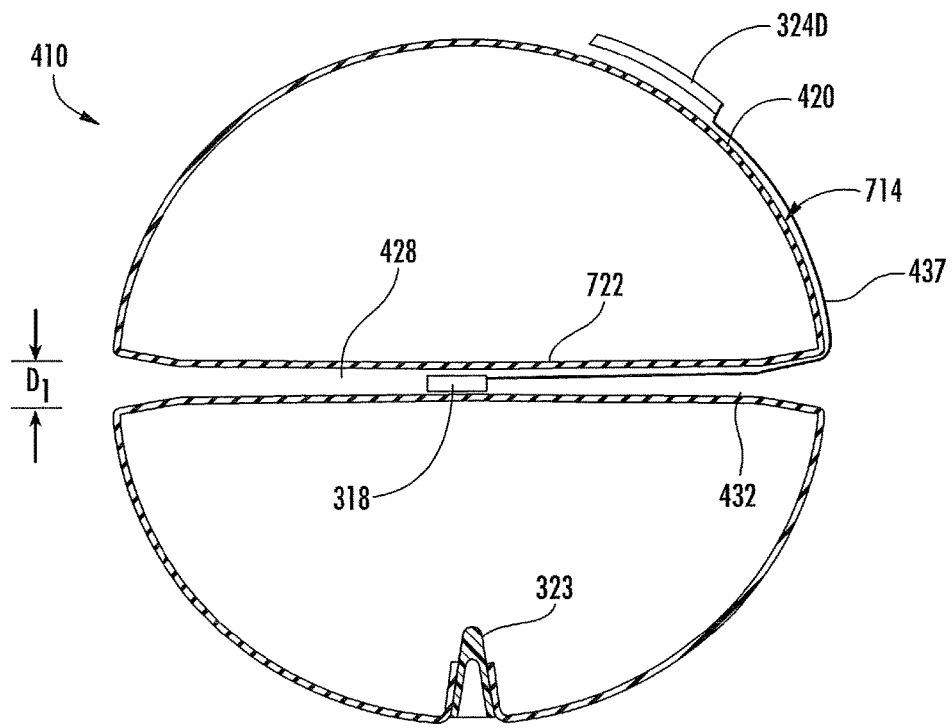
FIG. 8 is a sectional view of a portion of another implementation of the ball of FIG. 1.
Figure 9:
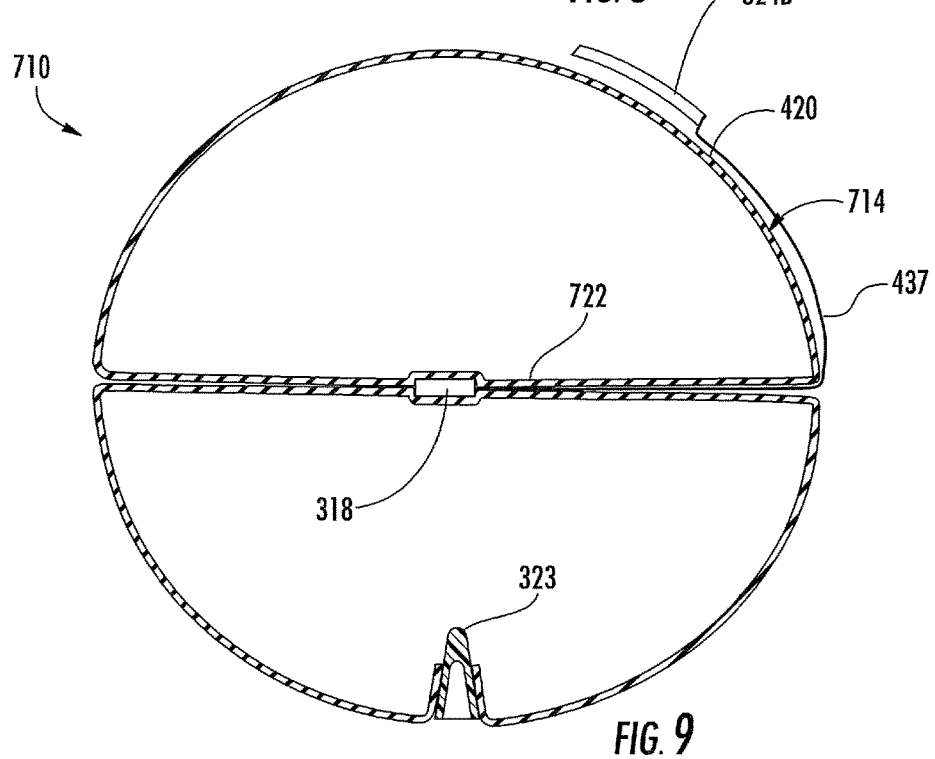
FIG. 9 is a sectional view of a portion of another implementation of the ball of FIG. 1.

FIGS. 8 and 9 are views illustrating a portion of basketball 710, an example implementation of basketball 410. Basketball 710 is similar basketball 410 except that basketball 710 comprises bladder 714 in lieu of bladder 414 omits chip mounting system 417. Those components or members of basketball 710 which correspond to components of basketball 410 are numbered similarly. Although not illustrated in FIG. 8, basketball 710 additionally comprises one of the basketball configurations shown in FIGS. 2-4.

Bladder 714 is similar to bladder 414 except the bladder 414 comprises internal tubular portion 722 in lieu of internal tubular portion 422. Internal tubular portion 722 comprises a flexible tubing extending through an intersecting a center point of basketball 710 and outer wall 420. As a result, outer wall 420 and tubular portion 722 form a donut-like inflatable interior which encircles tubular portion 722. Tubular portion 722 is sized receive electronic components, such as circuit chip 318 (described above).

FIGS. 8 and 9 illustrate bladder 714 in two different inflation states. FIG. 8 illustrates bladder 714 in an uninflated or partially inflated state while FIG. 9 illustrates bladder 714 in a greater inflation state wherein bladder 714 has a greater internal air pressure. As shown by FIG. 8, when bladder 714 is in the uninflated or partially inflated state, tubular portion 722 has an enlarged internal diameter D1 which facilitates insertion of circuit chip 318 into tubular portion 722. In one implementation, electronics or circuit chip 318 is positioned at a center point of bladder 714 of basketball 710 within tubular portion 722. In one implementation, circuit chip 318 is inserted into tubular portion 722 while electrical leads or wires 437 remain connected to circuit chip 318 and extend from circuit chip 318 out of to the portion 722 for connection to electronics or other devices along an exterior of bladder 714. In one implementation, the enlarged internal diameter of tubular portion 722 facilitates pulling or fishing of circuit chip 318 into the interior of tubular portion 722. In another implementation, the enlarged internal diameter of tubular portion 722 facilitates pushing circuit chip 318 into the interior of tubular portion 722 with a push rod or other push device.

As shown by FIG. 9, when bladder 714 is more fully inflated, tubular portion 712, under the increased pressure resulting from the increased internal pressure of bladder 714, collapses about circuit chip 318 and about electrical line 437. To facilitate such a collapse, tubular portion 722 is formed from one or more materials and/or has one or more appropriate wall thicknesses that cause such a collapse in response to bladder 714 being more fully inflated as compared to when circuit chip 318 was inserted into tubular portion 722. In the example illustrated, tubular portion 722 is configured (using materials and material wall thickness) such that to the portion 722 collapses about circuit chip 318 prior to bladder 714 being inflated above or beyond a maximum recommended in use inflation pressure (the inflation pressure that users are instructed to use with basketball 710, found on packaging or on an exterior of basketball 710) for bladder 714 and for basketball 710. In the example illustrated, tubular portion 722 is configured such that portion 722 collapses about circuit chip 318 prior to bladder 714 for being inflated above or beyond a middle of the recommended in use inflation pressure for bladder 714 and for basketball 710. In the example illustrated, tubular portion 722 is configured such that portion 722 collapses about circuit chip 318 prior to bladder 714 for being inflated above or beyond a minimum recommended in use inflation pressure for bladder 714 and for basketball 710.

Because tubular portion 722 collapses about circuit chip 318, tubular portion 722 retains circuit chip 318 in place without the use of welding, adhesives, glues or other affixing mechanisms or materials. In one implementation, tubular portion 722 collapses about circuit chip 318 to such an extent so as to form a water or moisture impermeable seal about circuit chip 318, protecting circuit chip 318 from such water or moisture. In the example illustrated, substantially the entirety of tubular portion 722, from one side of basketball 710 to the other side of basketball 710 collapses. In such implementations, because the two opposite end openings of tubular portion 722 are substantially closed along or adjacent to outer wall 420, plugs or other seals may be omitted as such openings may be omitted.

In the example illustrated in FIG. 9, substantially an entirety of tubular portion 722 extending through the interior bladder 714 has a uniform or homogenous construction such that the entirety of tubular portion 722 collapses upon greater inflation of bladder 714. In such an implementation, multiple circuit chips 318 or other discrete electronics packages may be inserted into to the portion 722 while bladder 714 is in the lower inflation state shown in FIG. 8, wherein upon being more fully inflated, tubular portion 722 collapses about each of the multiple circuit chips 318 and/or electronics packages, allowing different circuit chips 318 or circuit chip 318 and other electronics, such as light emitters, sound emitters and the like that may be electrically connected to circuit chip 318, to be physically separated or walled off from one another and retained in place.

Figure 10:
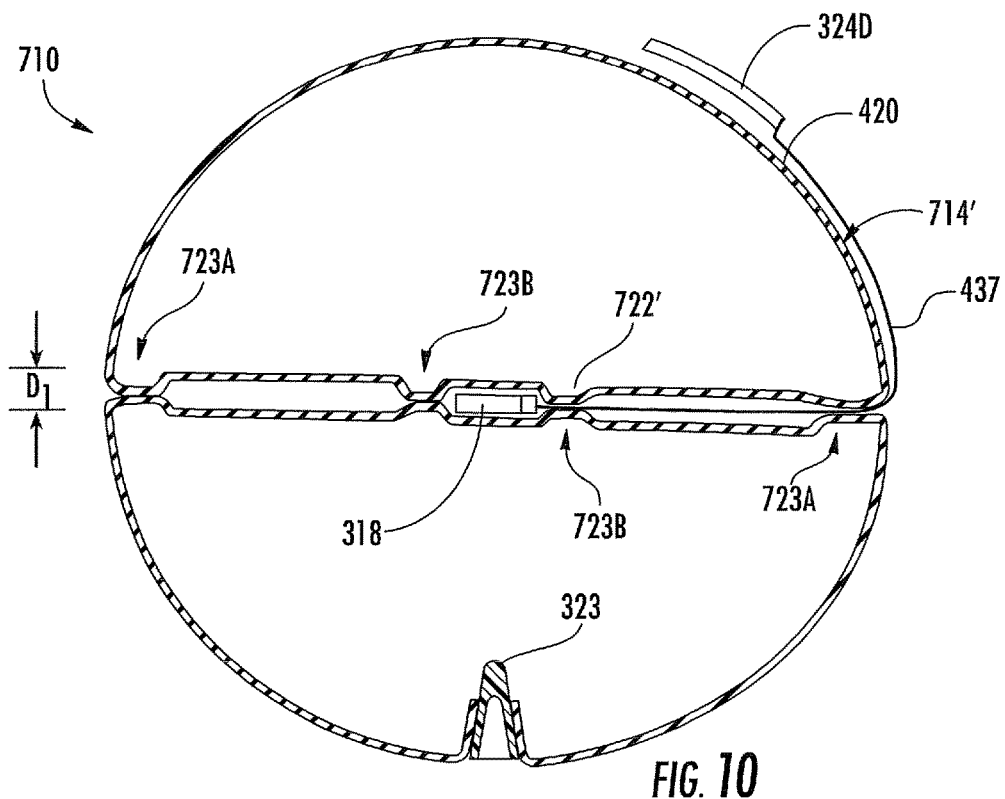
FIG. 10 is a sectional view of a portion of another implementation of the ball of FIG. 1.

FIG. 10 illustrates bladder 714' of basketball 710. Bladder 714' is similar to bladder 714 except that bladder 714' comprises tubular portion 722'. Tubular portion 722' is similar to tubular portion 722 except that to by the portion 722' comprises discrete portions or segments 723A and 723B (collectively referred to as segments 723) that are configured (through materials or wall thicknesses) to collapse (flex or expand towards the opposite circumferential side of tubular portion 722) differently than other portions of tubular portion 722'. In the example illustrated, such segments 723 collapse well before other portions of to the portion 722' collapse. In one implementation, the other portions of to the portion 722' do not collapse or collapse to a deminimus extent such that opposite internal walls of such portions do not contact or are not pressed against one another. Because only segments 723 have a reduce wall thickness or have a more collapsible material, the other portions of to the portion 722' may be made from more durable materials or may be provided with greater wall thickness, providing greater support in durability. As shown by FIG. 10, segments 723A collapse to close the end openings of tubular portion 722, reducing the need for plugs. Segments 723B collapse adjacent to circuit chip 318 to form a compartment or chamber about circuit chip 318 so as to retain circuit chip 318 in a predefined position.

Figure 11:
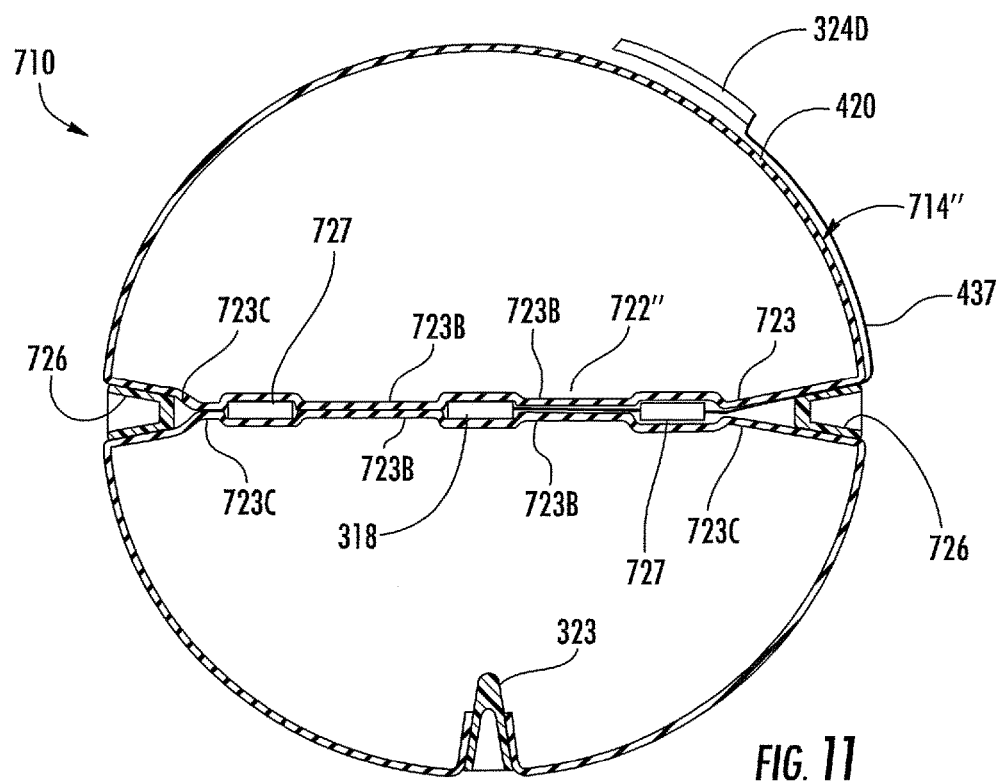
FIG. 11 is a sectional view of a portion of another implementation of the ball of FIG. 1.

FIG. 11 illustrates basketball 710 comprising bladder 714", another implementation of bladder 714. Bladder 714" is similar to bladder 714' is at the bladder 714" comprises tubular portion 722". Tubular portion 722" is similar to tubular portion 722' except that tubular portion 722" omits segments 723A, but comprises segments 723C and plugs 726. Segments 723C price portions of tubular portion 722" that are configured to collapse prior to any collapse of the remaining portions of tubular portion 722" (excluding other segments 723). Segments 723C cooperate with segments 723B to form multiple discrete space chambers 727 along a length of to the portion 722", wherein segments number 723 retain any components within such compartments in place. In some implementations, segments 723 provide water moisture impermeable seals.

Plugs 726 close or occlude and openings of tubular portion 722" to provide a uniform circumferential surface along the exterior bladder 714". In other implementations, plugs 726 may be omitted such as where bladder 74 additionally comprises segments 723A. In other implementations, bladder 714" may have other numbers of segments 723 to form or define a greater or fewer of such compartments 727.

In one implementation, each of segments 723 of bladder 714" are similar in materials and construction such that each of such segments 723 collapses at approximately the same time during and inflation of bladder 714". In other implementations, each of segments 723 of bladder 714 or particular sets of segments 723 of bladder 714 are differently configured so as to collapse at different triggering inflation pressures. In such an implementation, the sequential collapsing of the different segments may facilitate step-by-step precise positioning of the electronic packages within bladder 722". For example, upon inflation of bladder 714" to a first inflation pressure, a first segment 723 may collapse, forming an inherent stop against which electronics package may abut against when inserted through tubular portion 722". Upon reaching a second inflation pressure greater than the first inflation pressure, a next sequential segment 723 may collapse forming a second internal stop against which electronics package or circuit chip may abut when inserted into to the portion 722". This process can continue until each of the electronics packages is precisely located within to the portion 722 and sequentially locked in place by the collapse of such segments 723. By precisely locating the collapse point of different segments 723 along tubular portion 722", the positioning of electronics within tubular portion 722" may also be precisely defined and/or controlled.

Figure 12:
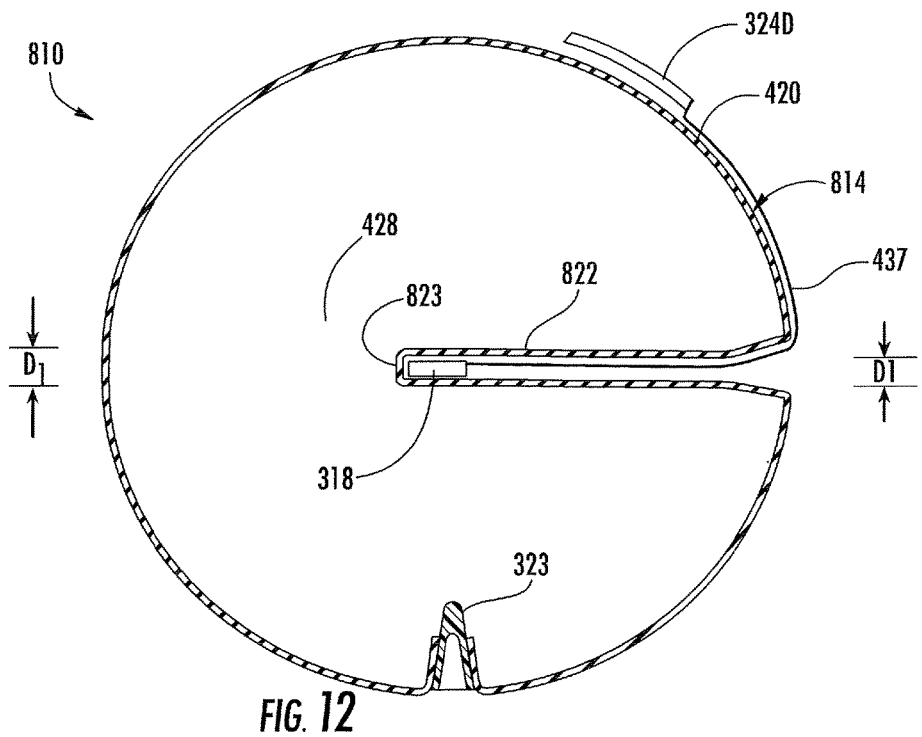
FIG. 12 is a sectional view of a portion of another implementation of the ball of FIG. 1.
Figure 13:
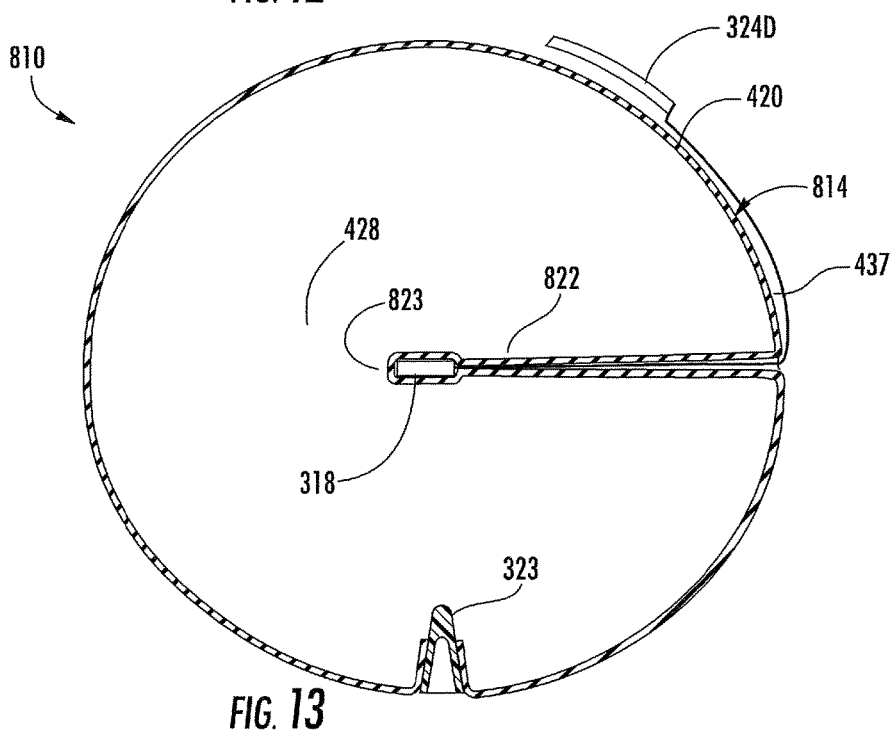
FIG. 13 is a sectional view of a portion of another implementation of the ball of FIG. 1.

FIGS. 12 and 13 are sectional views illustrating a portion of basketball 810, an example implementation of basketball 710. Basketball 810 is similar basketball 710 except that basketball 810 comprises bladder 814 in lieu of bladder 714. Those components or members of basketball 810 which correspond to components of basketball 710 are numbered similarly. Although not illustrated in FIG. 12, basketball 810 additionally comprises one of the basketball configurations shown in FIGS. 2-4.

Bladder 814 is similar to bladder 714 except the bladder 814 comprises internal tubular portion 822 in lieu of internal tubular portion 722. Internal tubular portion 822 comprises a flexible tubing extending into an interior of bladder 814, terminating at a blind or closed off end 823. As a result, outer wall 420 and tubular portion 722 form and inflatable interior which encircles tubular portion 822 in which extend across an end of tubular portion 822. Tubular portion 822 is sized receive electronic components, such as circuit chip 318 (described above).

FIGS. 12 and 13 illustrate bladder 814 in two different inflation states. FIG. 12 illustrates bladder 814 in an uninflated or partially inflated state while FIG. 13 illustrates bladder 814 in a greater inflation state wherein bladder 814 has a greater internal air pressure. As shown by FIG. 12, when bladder 814 is in the uninflated or partially inflated state, tubular portion 822 has an enlarged internal diameter D1 which facilitates insertion of circuit chip 318 into tubular portion 822. The internal surface of end 823 of tubular portion 822 serves as a stop surface for locating circuit chip 318. As a result, by precisely controlling the interior of end portion 823, the positioning of circuit chip 318 may also be precisely located in controlled. In one implementation, end portion 823 is located at a center point of bladder 814 of basketball 810 such that electronics or circuit chip 318 is positioned at a center point of bladder 814 and of basketball 810. In one implementation, circuit chip 318 is inserted into tubular portion 822 while electrical leads or wires 437 remain connected to circuit chip 318 and extend from circuit chip 318 out of tubular portion 822 for connection to electronics or other devices along an exterior of bladder 814. In one implementation, the enlarged internal diameter of tubular portion 722 facilitates pushing of circuit chip 318 into the interior of tubular portion 722 with a push rod or other push device.

As shown by FIG. 13, when bladder 814 is more fully inflated, tubular portion 822, under the increased pressure resulting from the increased internal pressure of bladder 814, collapses about circuit chip 318 and about electrical line 437. To facilitate such a collapse, tubular portion 822 is formed from one or more materials and/or has one or more appropriate wall thicknesses that cause such a collapse in response to bladder 814 being more fully inflated as compared to when circuit chip 318 was inserted into tubular portion 822. In the example illustrated, tubular portion 822 is configured (using materials and material wall thickness) such that tubular portion 822 collapses about circuit chip 318 prior to bladder 814 being inflated above or beyond a maximum recommended in use inflation pressure (the inflation pressure that users are instructed to use with basketball 810, found on packaging or on an exterior of basketball 810) for bladder 814 and for basketball 810. In the example illustrated, tubular portion 822 is configured such that portion 822 collapses about circuit chip 318 prior to bladder 814 for being inflated above or beyond a middle of the recommended in use inflation pressure for bladder 814 and for basketball 810. In the example illustrated, tubular portion 822 is configured such that portion 822 collapses about circuit chip 318 prior to bladder 814 for being inflated above or beyond a minimum recommended in use inflation pressure for bladder 814 and for basketball 810.

Because tubular portion 822 collapses about circuit chip 318, tubular portion 822 retains circuit chip 318 in place without the use of welding, adhesives, glues or other affixing mechanisms or materials. In one implementation, tubular portion 822 collapses about circuit chip 318 to such an extent so as to form a water or moisture impermeable seal about circuit chip 318, protecting circuit chip 318 from such water or moisture. In the example illustrated, substantially the entirety of tubular portion 822 collapses. In such implementations, because the end opening of tubular portion 822 is substantially closed along or adjacent to outer wall 420, plugs or other seals may be omitted.

Figure 14:
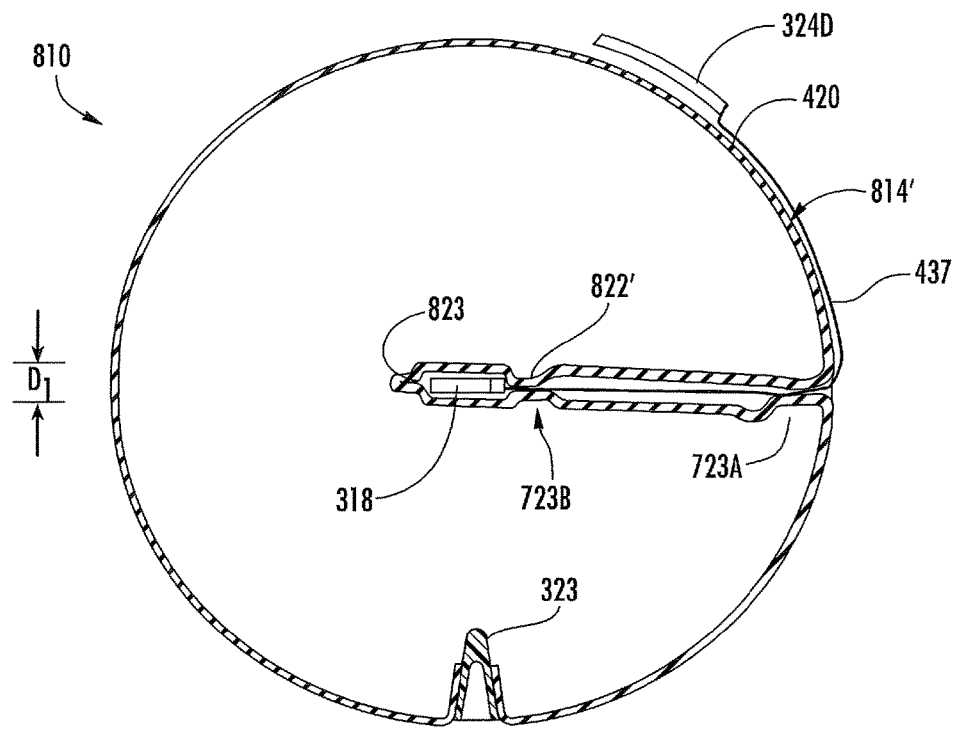
FIG. 14 is a sectional view of a portion of another implementation of the ball of FIG. 1.

As with tubular portions 722' and 722", tubular portion 822 may have different degrees of compressibility or collapsibility along its length. FIG. 14 illustrates basketball 810 comprising bladder 814' in place of bladder 814. Bladder 814' comprises tubular portion 822' in place of tubular portion 822. As shown by FIG. 14, tubular portion 822' comprises one segment 723A adjacent to the opening of tubular portion 822' and may include another segment 723B adjacent to an end of circuit chip 318 so as to capture circuit chip 318 between segment 723B and end portion 823. In such an implementation, the remaining portions of tubular portion 822 may be configured so as to not collapse, providing the rest of tubular portion 822 with greater durability and greater rigidity so as to cantilever circuit chip 318 closer to a center point of bladder 814'. In one implementation, tubular portion 822' is rigid along its entire length but for ace discrete individual segment or portion 723B which collapses in response to greater inflation pressure to close off and possibly seal circuit chip 318 in place between the collapse segment 723B and end portion 823. In such an implementation, circuit 318 is more rigidly supported and maintained at a center point of bladder 814'.

Figure 15:
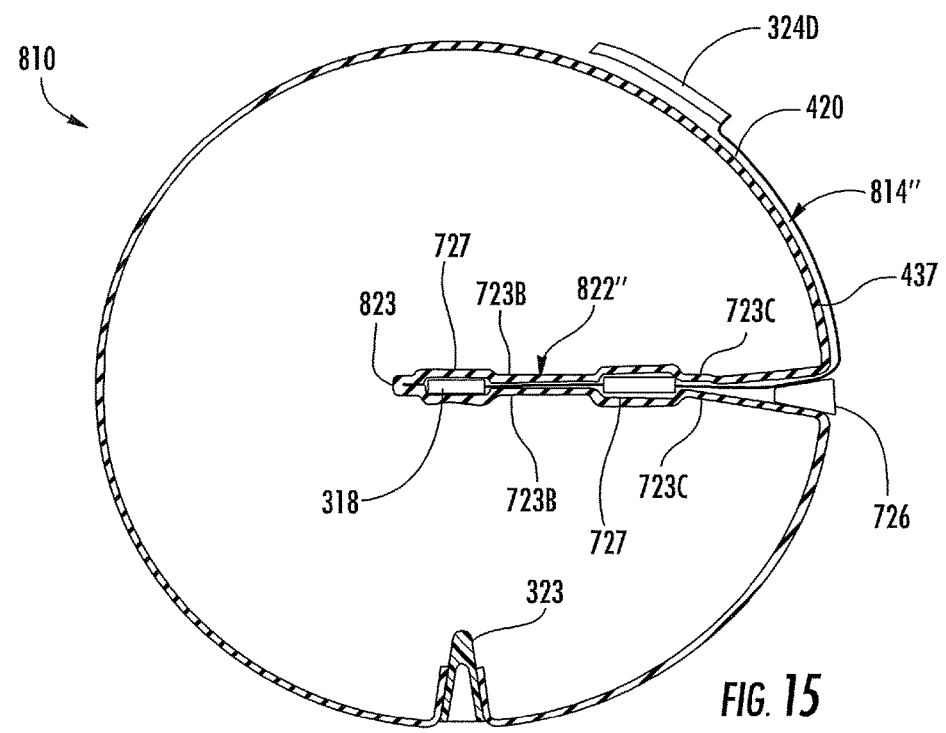
FIG. 15 is a sectional view of a portion of another implementation of the ball of FIG. 1.
Figure 16:
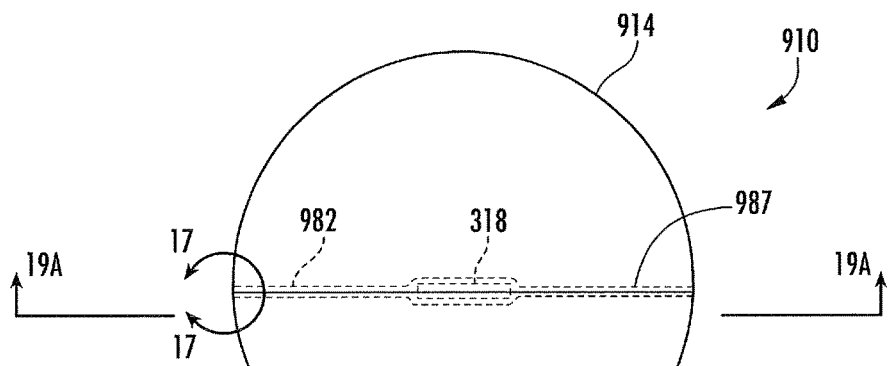
FIG. 16 is a side view of another example implementation of the ball of FIG. 1.

FIG. 15 illustrates basketball 810 comprising bladder 814" in place of bladder 814. As shown by FIG. 15, similar to tubular portion 722", tubular portion 822" comprises multiple segments such a segments 723B and 723C' which form multiple discrete spaced compartments 727 along the length of tubular portion 822", wherein the discrete compartments may contain different electronic packages or circuit chips. As noted above, in some implementations, the multiple compression segments 723 may be configured to collapse at different inflation points or triggers, facilitating sequential insertion of electronic packages when bladder 814" is at different inflation pressures to precisely and sequentially close individual compartments 727 and to precisely locate multiple electronic packages within tubular portion 814". In some implementations, the opening of tubular portion 822" may be occluded by the collapsing of a segment 723A while in other implementations, the opening may be occluded by a plug 726.

FIGS. 16, 17, 18 and 19A illustrate an internal portion of basketball 910, another example implementation of basketball 310. Basketball 910 is similar to basketball 310 except that basketball 910 comprises bladder 914 in lieu of bladder 314. The remainder basketball 910 is similar to basketball 310, having one of the configurations shown in FIGS. 2-3.

Figures 17, 18:
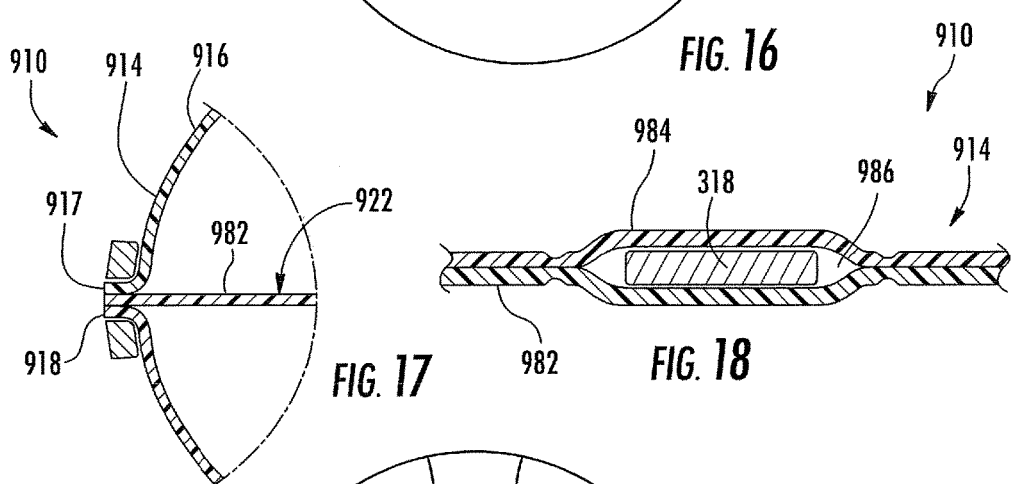
FIG. 17 is a fragmentary sectional view of the ball of FIG. 16 taken along line 17-17.
FIG. 18 is an enlarged fragmentary sectional view of an internal portion of the ball of FIG. 16.

Bladder 914 is similar to bladder 314 except the bladder 914 comprises at least one panel 916 having end portions 917 joined along an exterior seam 918 (shown in FIG. 17). Bladder 914 is specifically illustrated as further comprising electronic support 922. In the example shown, bladder 914 is formed from two or more panels 916 having end portions 917 joined along seams 918 on opposite sides of bladder 914. In another implementation, bladder 914 is formed from a single panel 916 having end portions 917 joined along a single seam 918. In yet another implementation, bladder 914 is formed from panels having end or edge portions joined along multiple seams 918. As shown by FIG. 17, in one implementation, each of the one or more seams 918 forms a rib which serves as a boundary between consecutive cover panels 320 of the configurations of FIGS. 3 and 4 described above. In other implementations, one or more of such seems 918 may be turned inwardly.

Because bladder 914 is formed from one or more single or multilayered sheets or panels 916, bladder 914 more easily supports electronic support 922. As shown by FIG. 17, in one implementation, electronic support 922 comprises a cross-member 982 extending within bladder 914. As shown by FIG. 18, in one implementation, electronic support 922 additionally comprises cover panel 984 which cooperates with cross-member 982 to form a compartment, chamber or pocket 986 which receives circuit chip 318 and contains circuit chip 318. In other implementations, circuit chip 318 may alternatively be welded, bond, adhered, fastened or otherwise attached to a face of cross-member 982, omitting cover panel 984.

Figure 19A:
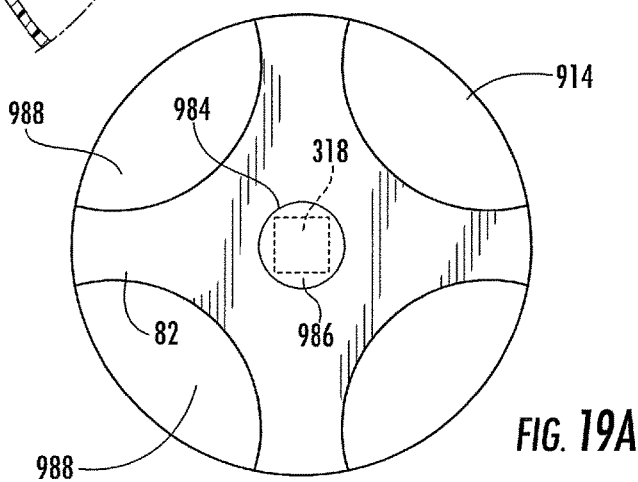
FIG. 19A is a sectional view of another example implementation of the ball of FIG. 1 taken along line 19A-19A.

As shown by FIG. 19A, the electronic chip 318 and the pocket 986 are positioned on a cross-member 982 longitudinally extending across the bladder 914. The cross-member 982 can be a planar, single or multi-layered sheet of material used to support the electronic chip 318 within the internal volume of bladder 914. In one particularly preferred embodiment, the cross-member 982 is a sheet that is bonded, preferably through RF welding, between first and second panels or sheets 916 of the bladder 914. The cross-member 982 thereby becomes part of the bladder seam 987, which provides generally uniform structural support to the cross-member 982. The cross-member 82 can be formed of a mixture of vinyl and polyester urethane. The mixture can be new material or a regrind of such materials. Alternatively, it can be formed of vinyl, other urethanes, fabric, a thermoplastic, other polymeric materials, rubber and combinations thereof. In implementations where electronic chip 318 comprises one or more light emitters 324, cross-member 982 is formed from one or more translucent or transparent materials and/or includes openings there through allowing emitted light to pass through cross-member 982.

The cross-member 982 provides support to the electronic chip 318 in two dimensions across a plane. The uniform support provided by the bladder seam 97 enables the electronic chip 318 to be supported in the single plane. The material of the cross-member 982 and the tightness, tautness, or tension created during the formation of the bladder 914 can be varied to produce the desired operating position for the electronic chip 918. A stiffer, more rigid and/or higher tensioned material forming the cross-member 982 can be used to inhibit movement of the electronic chip 318 during play. In one preferred embodiment the cross-member 982 has a thickness of at least 0.004 inch, has an ultimate tensile strength of at least 3000 psi and has an ultimate elongation of at least 250 percent. In a particularly preferred embodiment, the cross-member has a thickness of at least 0.005 inch, an ultimate tensile strength of at least 7000 psi and an ultimate elongation of at least 400 percent.

The cross-member 982 preferably includes one or more openings 988 for allowing air within the bladder 914 to move freely from one side of the cross-member 982 to the other, and to readily equalize within the bladder during use. Without the openings 984, the further pressurized air cannot communicate with the volume of air on the opposite side of the cross-member to equalize the pressure within basketball 910. The pressure difference can have a negative effect on the dribbling and performance of the basketball 910. The openings 984 eliminate this issue by allowing for pressure to readily equalize throughout the internal volume of the bladder 914 following an impact.

Referring to FIG. 19A, the cross-member 982 supports the electronic chip 318 longitudinally and laterally about a plane defined by the cross-member 982. The cross-member 982 and the bladder seam 987 define the four symmetrically spaced openings 988.

The cross-member 982 can be foamed of a very rigid and/or taut material inhibiting movement of the electronic chip 918 during movement of the basketball 310 and following impacts to the cover panels 320 of the basketball 310. Accordingly, when the bladder 914 within the basketball 310 is inflated to the recommended operating pressure range, the bladder 914 expands under the pressure. The expansion of the bladder 914 and the bladder seam 987 can render the cross-member taut and applies a tensile load to the cross-member 982 to keep the cross-member 982 in a taut position. The inflation of the bladder 914 to the recommended operating pressure can place a tensile load onto the cross-member 982. Additionally, the inflation of the bladder 914 to the recommended operating pressure can also cause the cross-member 982 to elongate in one or more direction depending upon the points of attachment of the cross-member 982 to the bladder side walls at the bladder seam 988. The elongation of the cross-member 982 is preferably within the range of 10 to 300 percent in at least one direction about the cross-member 982. In alternative embodiments, the cross-member 982 can be formed of a flexible material that more readily absorbs impacts during use.

Figure 19B:
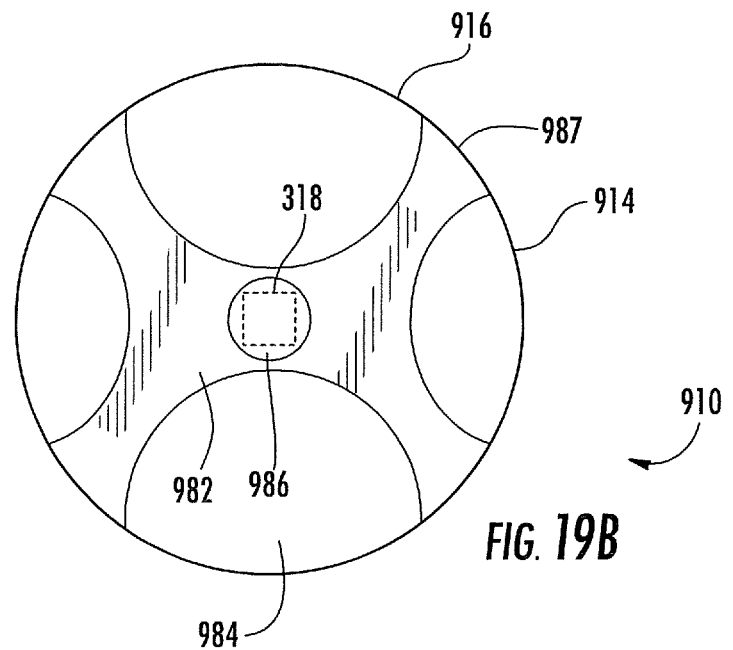
FIG. 19B is a sectional view of another example implementation of the ball of FIG. 1 taken along line 19A-19A.
Figure 19C:
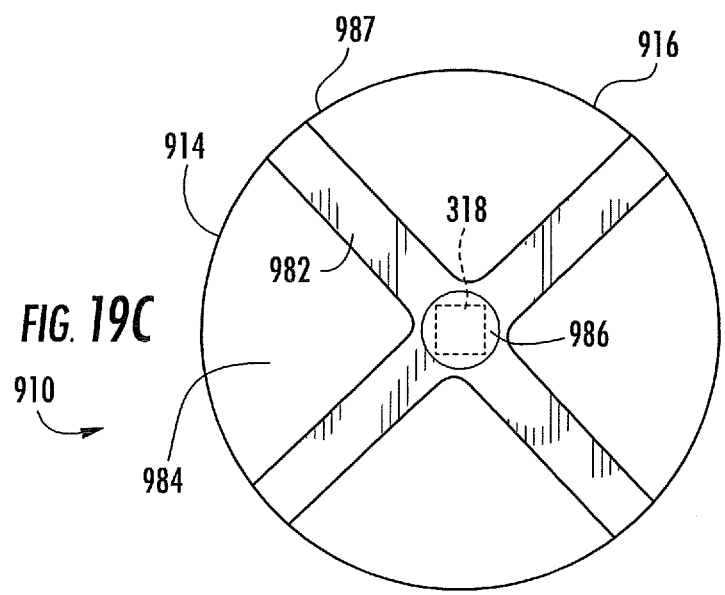
FIG. 19C is a sectional view of another example implementation of the ball of FIG. 1 taken along line 19A-19A.

Referring to FIGS. 19B and 19C, two alternative implementations of the cross-member 982 within the bladder 914 are shown. In each embodiment, the openings 984 are defined by the cross-member 982 and the bladder seam 987. In each embodiment, the electronic chip 318 is supported bi-directionally about the plane defined by the cross-member 982 and the bladder seam 988. In implementations where electronic chip 318 comprises one or more light emitters 324, cross-member 982 is formed from one or more translucent or transparent materials and/or includes openings there through allowing emitted light to pass through cross-member 982.

Figure 19D:
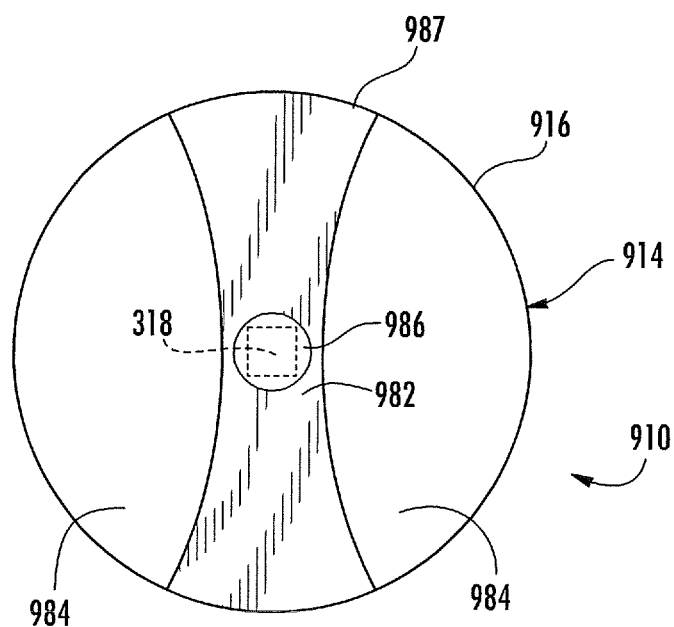
FIG. 19D is a sectional view of another example implementation of the ball of FIG. 1 taken along line 19A-19A.
Figure 19E:
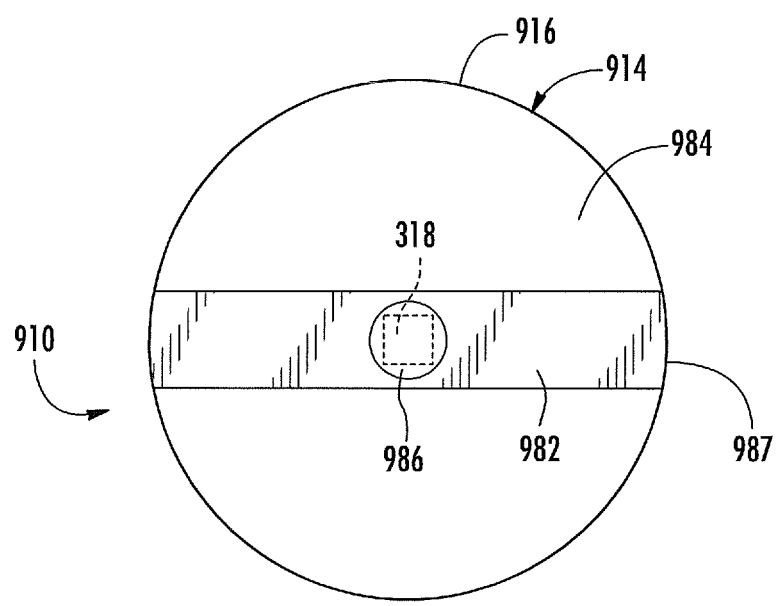
FIG. 19E is a sectional view of another example implementation of the ball of FIG. 1 taken along line 19A-19A.

Referring to FIGS. 19D and 19E, two additional alternative implementations of the cross-member 982 within the bladder 914 are shown. In FIG. 19D, the cross-member 982 extends laterally or transversely across the internal volume of the bladder 914. In FIG. 19E, the cross-member 982 extends longitudinally across the internal volume of the bladder 14. In each embodiment, the cross-member 982 and the bladder seam 98 define two large openings 984. In other alternative preferred embodiments, the cross-member 982 can be formed of a plurality of threads, cords, wires, strings, springs, straps, bands, sheets or combinations thereof that support the electronic chip 318 within the bladder 914. In implementations where electronic chip 318 comprises one or more light emitters 324, cross-member 982 is formed from one or more translucent or transparent materials and/or includes openings there through allowing emitted light to pass through cross-member 982.

Figure 20:
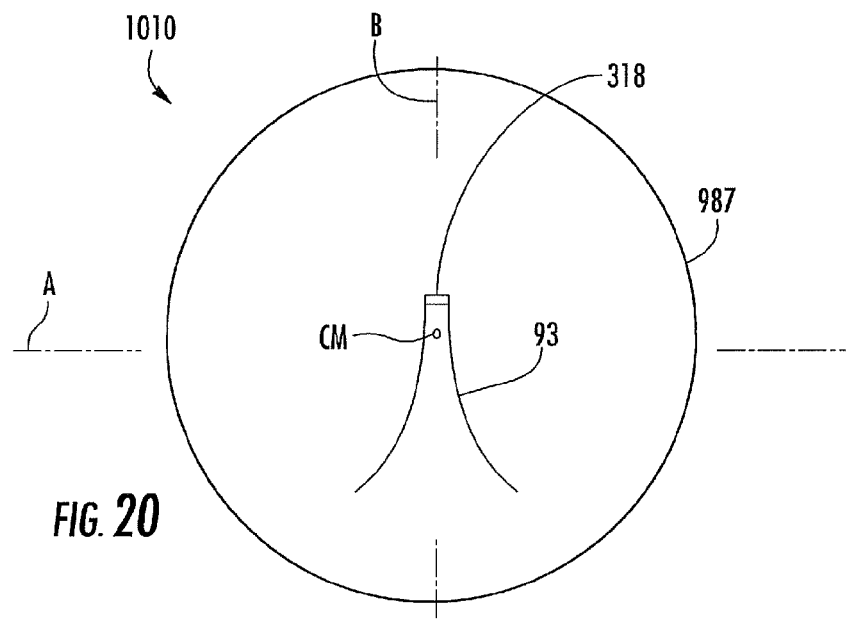
FIG. 20 is a sectional view of another example implementation of the ball of FIG. 1.

FIG. 20 illustrates a portion of basketball 1010, an alternative implementation of basketball 310. Basketball 1010 is similar to basketball 310 except that basketball 1010 is specifically illustrated as supporting circuit chip 318 with tower 93. Those remaining components of basketball 1010 correspond to basketball 310. Basketball 1010 may include any the configuration shown in FIGS. 2-4. As shown by FIG. 20, electronic chip 318 is supported by a tower 93 extending within the interior of bladder 314. In the example shown, bladder 314 comprises an internal tower 93 supporting chip 318. In one implementation, tower 93 comprises a resiliently flexible structure welded, bonded, fused or integrally formed as part of the outer walls of bladder 914 and projecting into or towards a center of bladder 914. In the example illustrated, tower 93 widens at its base for greater stability. In other implementations, tower 93 may have other configurations. For example, the tower can be a narrow cylindrical structure. In other implementations, tower 93 may be rigid.

In the example illustrated, tower 93 extends beyond the axis A of bladder 314. Tower 93 extends beyond axis A by a sufficient distance such that, given the mass of chip 318 and the mass of tower 93, tower 93 and chip 318 do not alter a balance of bladder 314 or the ultimately formed basketball 910. In particular, the entire structure formed by tower 93 and chip 318 has a center of mass CM aligned with axis A and axis B. In other implementations, tower 93 and chip 318 may have a CM at other locations and may have other configurations. In one implementation, the tower 93 may extend within a range of 1 to 4 inches within the exterior wall or panel 987 or 916 of bladder. In one implementation, the air pressure with the bladder 314 maintains the chip 318 and the tower 93 in position and serves to inhibit movement of the chip 318 and/or the tower 93. In another implementation, the rigidity of the tower 93 and its connection to the bladder 314 can be used to inhibit movement of the chip 318 within the bladder 314.

Figure 21:
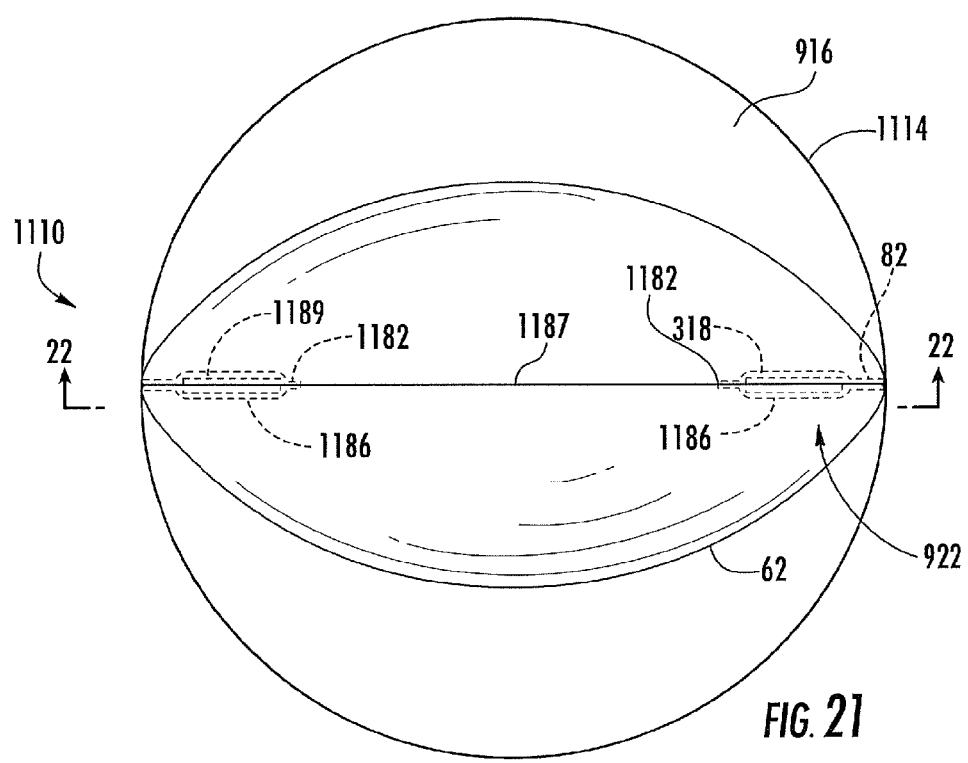
FIG. 21 is a sectional view of another example implementation of the ball of FIG. 1.
Figure 22:
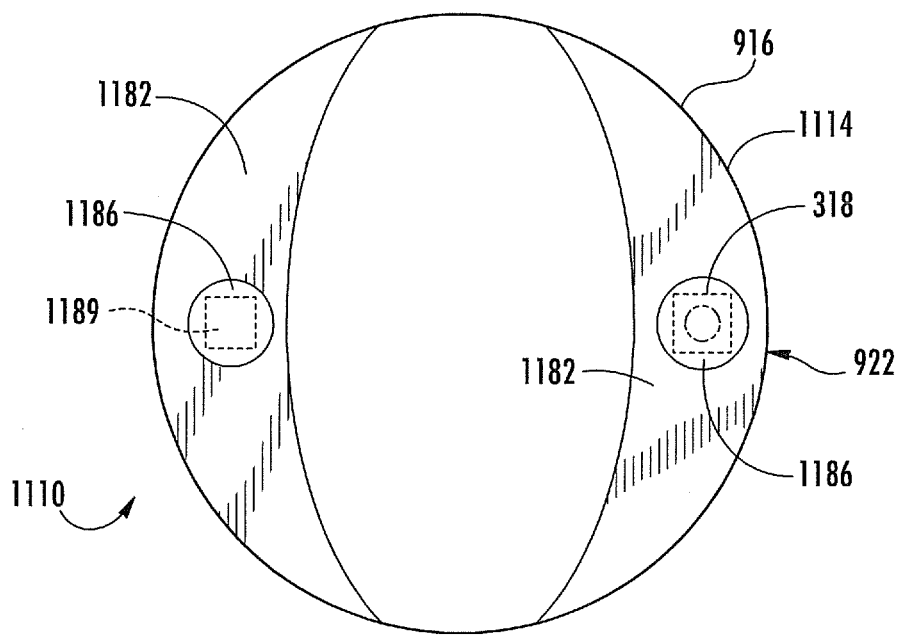
FIG. 22 is a sectional view of another example implementation of the ball of FIG. 1 taken along line 19A-19A.

FIGS. 21 and 22 illustrate basketball 1110, another example implementation of basketball 310. Basketball 1110 is similar to basketball 310 except that basketball 1110 comprises bladder 1114. Those remaining components of basketball 1110 which correspond to components of basketball 310 are numbered similarly. In one implementation, basketball 1110 includes one of the configurations shown in FIGS. 2-4. As shown by FIG. 21, bladder 1114 is similar to bladder 914 of FIG. 16 except the bladder 1114 is formed from six panels 916 joined to one another to form these spherical shape of bladder 1114. In other implementations, bladder 1114 may be formed from a fewer greater of such panels.

As further shown by FIG. 21, bladder 1114 employs an electronics support 922 formed from at least two cross-members 1182 positioned at opposite ends of the bladder 1114. Each cross-member 1182 can include the pocket 1186 for receiving an electronic chip 318 or a counterweight 1189. Two separate electronic chips 318 can be used in this preferred embodiment, or a single electronic chip 318 can be positioned on one cross-member 382 and the counterweight 1189 can be positioned at the opposite end of the bladder 1114. In this embodiment, the electronic chip 318 is suspended within the bladder 1114 by one of the cross-members 1182 at a position that is close to one end of the bladder 1114. The distance between the electronic chip 318 and the bladder seam 1187 is very small reducing the ability of the cross-member 1182 and the electronic chip 318 to deflect during use. The counterweight 1189 can be positioned in a second cross-member 1182, located at the opposite end of the bladder 1114, to counterbalance the electronic chip 318. The counterweight 1189 can have substantially the same weight as the electronic chip 318. Although FIG. 21 illustrates a separate cross-member 1182, one at each end of the bladder 1114 with an electronic chip and a counterweight positioned in the pockets of the separate cross-members, in an alternative preferred embodiment, a single cross-member 1182 positioned at one end of the bladder and having a pocket 1186 with the electronic chip within it can be used. In this embodiment, neither an electronic chip nor a counterweight is positioned at the opposite end of the bladder. In another implementation, the counterweight can be omitted. In another implementation, a second chip can be used instead of the counterweight.

Figure 23:
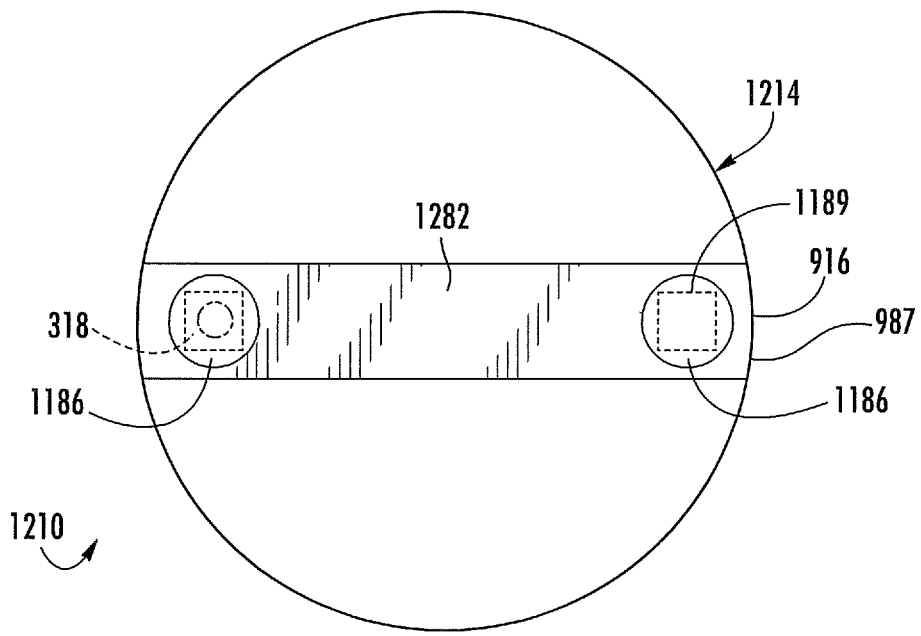
FIG. 23 is a sectional view of another example implementation of the ball of FIG. 1 taken along line 19A-19A.

FIG. 23 illustrates a portion of basketball 1210, another implementation of basketball 310. Basketball 1210 is similar to basketball 310 and may include any the configuration shown in FIGS. 2-4. As shown by FIG. 22, basketball 1210 comprises a bladder 1214 having a single cross-member 1282 that can be used to support both the electronic chip 318 and/or the counterweight 1189 (or a second electronic chip). Preferably, the electronic chip 318 and the counterweight 1189 are positioned at or near opposite ends of the internal volume of the bladder 1214. In this embodiment, the single cross-member 1282 includes two pockets 1186 (one at each end of the bladder 14). One pocket 64 retains the electronic chip and the second pocket 1186 contains either the counterweight 1189 or a second electronic chip. The single cross-member 1282 is shown extending longitudinally about the bladder 1214 in a plane defined by the cross-member 1282. The cross-member 1282 is secured to the 916 of the bladder 1214 at the bladder seam 987. In implementations where electronic chip 318 comprises one or more light emitters 324, cross-member 1282 is formed from one or more translucent or transparent materials and/or includes openings there through allowing emitted light to pass through cross-member 1282.

Figure 24:
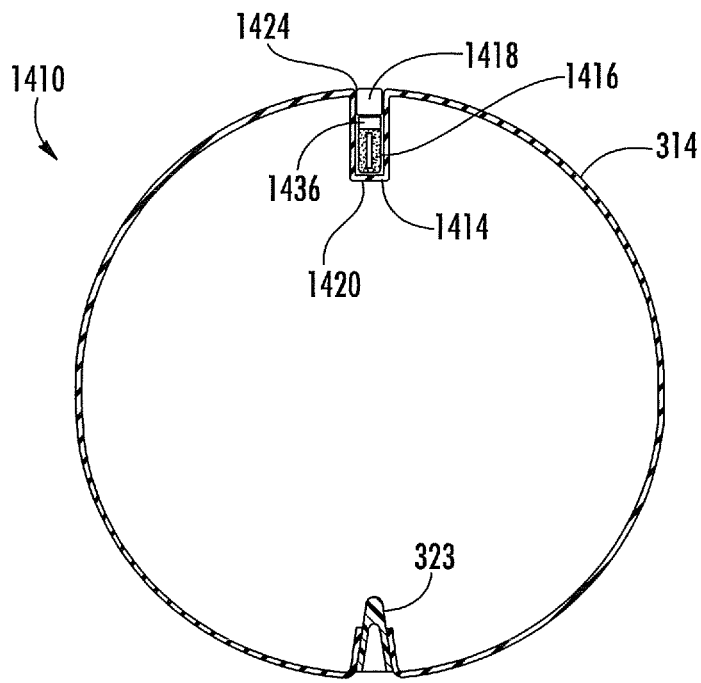
FIG. 24 is a sectional view of another example implementation of the ball of FIG. 1.

FIG. 24 is a sectional view of ball 1410, another implementation of ball 310, shown as an example basketball. Ball 1410 is similar to ball 310 except that all 1410 additionally comprises insert receptacle 1414, electronics insert 1416 and plug 1418. The remaining components of ball 1410 illustrated in FIG. 24 which correspond to components of basketball 310 are numbered similarly.

Insert receptacle 1418 extends into bladder 314 (shown in an at least partially inflated state) and forms a cavity 1420 for receiving insert 1416. In one implementation, receptacle 1418 comprises a distinct member from bladder 314 which is treated, such as by being vulcanized, so as to fuse or join to the material bladder 1414. In yet other implementations, receptacle 1418 is integrally formed as a single unitary body with the remainder of bladder 314. In yet another implementation, receptacle 1414 comprises a separate component welded, fused, stitched, adhered to or fastened to a remainder of bladder 314 in other fashions.

In the example illustrated, receptacle 1418 is formed from a flexible and resiliently stretchable material. In one implementation, receptacle 1418 is formed from the same material as bladder 314. In other implementations, receptacle 1460 may be formed from other flexible resiliently flexible materials. As a result, upon being inflated to a recommended pressure for use of basketball 1410, receptacle 1418 can be configured squeeze about electronics insert 1416 and plug 1418 to assist in securing insert 1416 and possibly plug 1418 in place. In yet other implementations, receptacle 1418 may alternatively be formed from a rigid or less flexible material such that receptacle 1418 does not significantly change in shape, dimension or proportion in response to inflation of bladder 314.

In the example illustrated, receptacle 1418 extends partially into the interior of bladder 314. In the example illustrated, receptacle 1418 is located directly opposite to the valve assembly 322 (shown in FIG. 1) and inflation tube 323. As a result, receptacle 1418 offsets the opposite weight of valve assembly 322 and inflation tube 323. In one implementation, receptacle 1418, electronics insert 1416 and plug 1418 have a weight substantially matching the weight of valve assembly 322 and inflation tube 323 to provide balance to ball 1410. In other implementations, receptacle 1418 as well as the contained insert 1416 and plug 1418 are formed so as to project into the interior of bladder 314 at other locations relative to valve assembly 322 and inflation tube 323. In other implementations, the insert 1416 can incorporated into the valve assembly 322 or 323. The insert can be tubular or take other shapes to accommodate the valve assembly 322 in combination with the electronics and battery.

Figure 25:
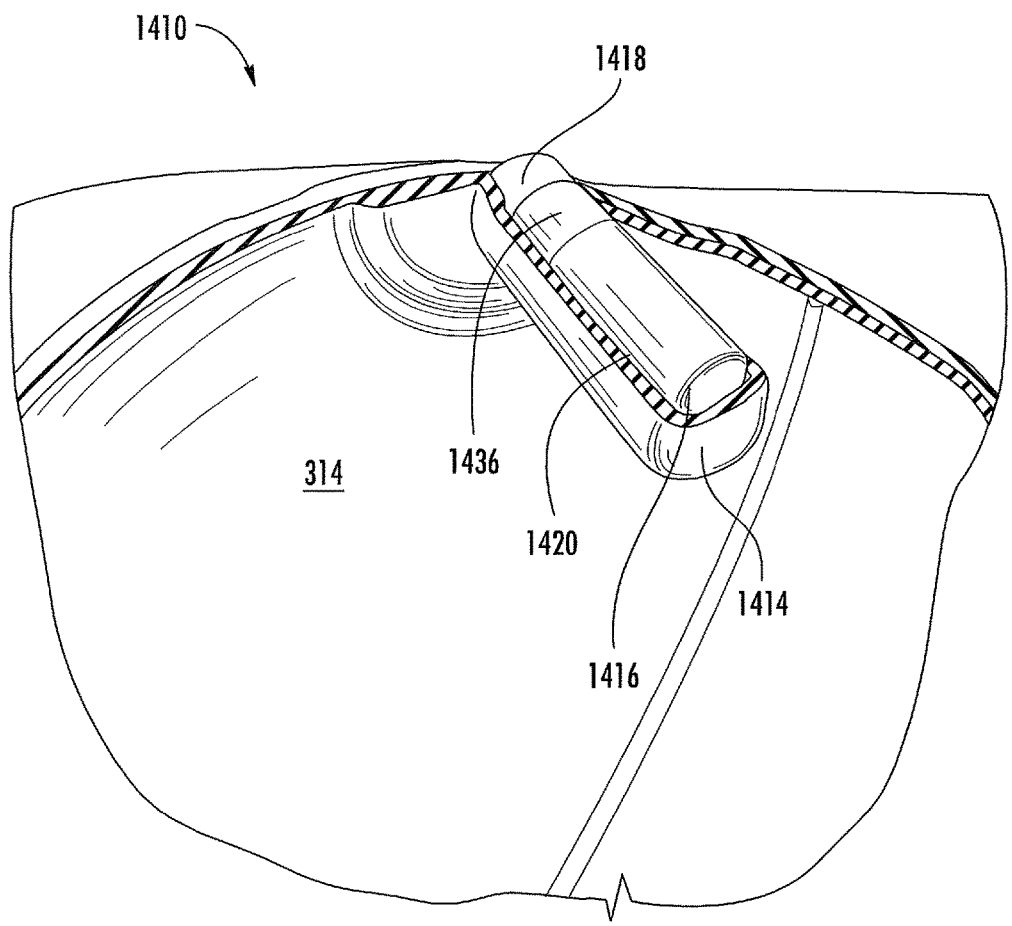
FIG. 25 is a sectional view of the basketball of FIG. 24.
Figure 26:
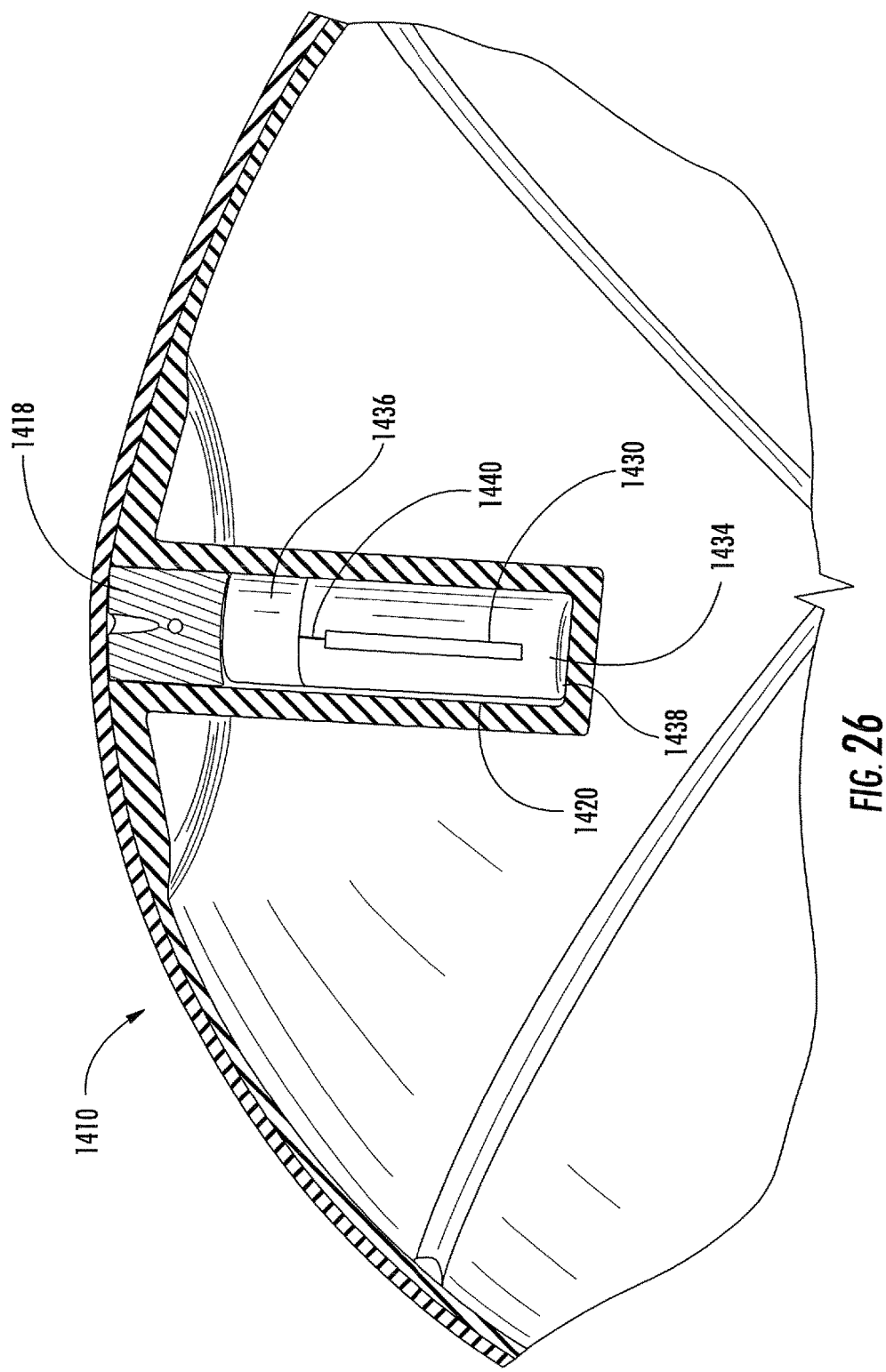
FIG. 26 is a sectional view of the basketball of FIG. 24.

Electronics insert 1416 comprises a single body, member or unit inserted through mouth 1424 of receptacle 1414 into cavity 1420 where insert 1416 is retained. FIGS. 25 and 26 are sectional views of ball 1410 illustrating insert 1416 positioned within cavity 1420 of receptacle 1418. As shown by FIG. 26, insert 1416 comprises electronics 1430, potting compound 1434 and the battery 1436. Electronics 1430 comprises one or more electronic components to carry out the sensing of one or more characteristics associated with basketball 1410 and to carry out one or more of the transmission, storage and/or analysis of data resulting from the sense characteristics. In one implementation, electronics 1430 comprises electronic chip 318 (described above) except that electronics 1430 comprises battery 1436 in lieu of battery 122. In the example illustrated, electronics 1430 transmits one or more electronic signals which indicate the location, movement, speed, acceleration, deceleration, rotation and/or temperature of ball 1410. Alternatively, electronics 1436 comprises a passive circuit that allows the detection of the location, movement, speed, acceleration, deceleration, rotation and/or temperature of ball 1410 to be ascertained when subjected to a magnetic field or other sensing system. In one implementation, electronics comprises a circuit board supporting one or more sensors to sense the location, movement, speed, acceleration, deceleration and/or rotation of basketball 1410.

Potting compound 1434 comprises a mass of solid compound at least substantially encapsulating, if not completely encapsulating, electronics 1430. For purposes of this disclosure, the term "encapsulate" or "encapsulating" refers to a body or mass of material that contacts and closely conforms to the shape of the item being encapsulated which occurs as a result of the mass of material by being applied to the item being encapsulated while in a liquid, amorphous or gelatinous form, where the mass subsequently solidifies while about and against the item being encapsulated. The term "substantially encapsulate" or "substantially encapsulating" refers to the mass of material about and in close conformal contact with at least three sides of the item being encapsulated. The term "completely encapsulate" or "completely encapsulating" refers to the mass of material surrounding and enclosing on all sides of the item being encapsulated.

In one implementation, potting compound 1434 comprises a solidified mass of previously amorphous, gelatinous or liquid material. In one implementation, potting compound 1434 comprises a polyurethane, silicone or other solidified polymer. In one implementation, potting compound 1434 comprises a thermosetting plastic or silicone rubber gel. In another implementation, the potting compound 1434 can be formed of an epoxy, acrylonitrile butadiene styrene (ABS), or other thermoplastic material. In one implementation, potting compound 1434 comprises a low glass transition temperature potting compound to inhibit breakage of solder bonds during solidification.

Potting compound 1434, when solidified or hardened, forms an encapsulating body 1438 encapsulating electronics 1430. Encapsulating body 1438 is sized and shaped to fit within cavity 1420 of receptacle 1414. In the example illustrated, encapsulating body 1438 has an outer profile or shape that substantially matches the outer profile or shape of cavity 1420 so as to restrict or limit movement of body 1438 within cavity 1420. In the example illustrated in which cavity 1420 is cylindrical, body 1438 is also cylindrical. In other implementations, encapsulating body 1438 may have other shapes when cavity 1420 also has the same other corresponding shapes. For example, in one implementation, rather than comprising a cylinder having a circular cross-section, cavity 1420 may alternatively comprise a cylinder having an oval cross-section or a polygonal cross-section. In yet another implementation, cavity 1420 is spherical or oblong. In still other implementations, cavity 1420 may have other shapes. In still other implementations, encapsulating body 1438 has other shapes or configurations, not necessarily matching the internal shape of cavity 1420. In yet other implementations, an external service of encapsulating body 1438 may have one or more projections or detents, wherein the internal surface of cavity 1420 one or more other corresponding projections or detents. In such an implementation, at least one of the projection and detent resiliently flex to allow the projection to be snapped into the detent to facilitate securement and retention of body 1438 and insert 1416 within cavity 1420 of receptacle 1414.

In the example illustrated, potting compound 1434 completely encapsulates electronics 1430 but for one or more electrical conductors 1440, in the form of electrical filaments, wires or traces extending from electronics 1430 extending within and through potting compound 1434 from within body 1438 out of body 1438. In the example illustrated, potting compound 1434 solidifies while against and in contact with the electrical conductor 1440 to seal against and about electrical conductor 1440. In other implementations, a bore or other path is formed through body 1438 for the passage of electrical conductor 1440. Electrical conductor 1440 facilitates electrical connection of electronics 1430 to battery 1436.

Battery 1436 comprises a source of power for electronics 1430. Battery 1436 extends external to body 1438 at one axial end of body 1438. In one implementation, battery 1436 has an end portion encapsulated by potting compound 1434 so as to be joined to body 1438. In another implementation, battery 1436 is welded, fused, bonded, adhered or otherwise joined to an external surface of body 1438. As will be described hereafter, in yet other implementations, battery 1436 can be completely encapsulated by potting compound 1434 within body 1438, but for any electrical conductors extending from battery 1436 to locations external of body 1438. In still other implementations, battery 1436 may be independent of insert 1416, not fixedly or connected to body 1438 so as to be carried as a single unit with body 1438. For example, as will be described hereafter, in other implementations, battery 1436 may have an electrical terminal or contact in electrical connection with an external electrical terminal or contact of body 1438.

In one implementation, battery 1436 is a non-rechargeable battery. In yet another implementation, battery 1436 is rechargeable. In one implementation, battery 1436 is rechargeable via a charging port extending through plug 1418 into contact with a charging contact or terminal of battery 1436. In yet another implementation, as will be described hereafter battery 1436 is configured for wireless or inductive charging.

Plug 1418 comprises a member received within cavity 1420 between insert 1416 and an exterior of ball 1410. Plug 1418 assists in protecting unit 1416. In the example illustrated, plug 1418 is formed from a resiliently compressible material, such as a foam rubber, absorbing impacts of ball 1410. In other implementations, plug can be formed of other materials, such as, for example other rubbers, plastic, wood, metal, fiber composite materials, other thermoplastic materials, and/or thermoset materials. In one implementation, plug 1418 further provides an additional seal inhibiting the intrusion of moisture or other contaminants into the interior of cavity 1420. In yet other implementations, plug 1418 may other sizes, shapes or configurations and may be formed from incompressible materials.

Figure 27:
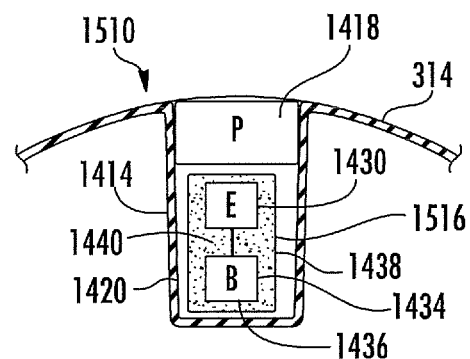
FIG. 27 is a fragmentary sectional view of an another example implementation of the basketball of FIG. 24.

FIG. 27 is a fragmentary sectional view of sporting or game ball 1510, shown as an example basketball. Ball 1510 is similar to ball 1410 except that ball 1510 comprises electronics insert 1516 in lieu of electronics insert 1416. Those remaining components of ball 1510 which correspond to components of basketball 1410 are numbered similarly.

Electronic insert 1516 is similar to electronics insert 1416 except that potting material 1434 completely encapsulates electronics 1430 and battery 1436. Encapsulating body 1438 completely encloses and surrounds electronics 1430 and battery 1436, wherein electrical conductor 1440 between electronics 1430 and battery 1436 is also completely encapsulated within body 1438. As a result, body 1438 offers additional protection for battery 1436.

Figure 28:
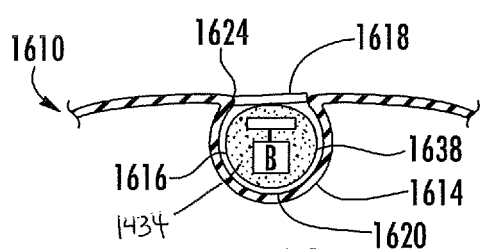
FIG. 28 is a fragmentary sectional view of an another example implementation of the basketball of FIG. 24.

FIG. 28 is a fragmentary sectional view of sporting or game ball 1610, shown as an example basketball. Ball 1610 is similar to ball 1510 except that ball 1610 comprises electronics receptacle 1614, electronics insert 1616 and plug 1618 in lieu of receptacle 1418, electronics insert 1516 and plug 1418, respectively. Those remaining components of ball 1610 which correspond to components of ball 1510 are numbered similarly.

Electronics receptacle 1618 is similar to electronics receptacle 1418 except that electronics receptacle 1618 has a different shape. In the example illustrated, electronics receptacle 1618 comprises a spherical cavity 1620. In yet other implementations, electronics receptacle 1618 may have other sizes and shapes.

Electronics insert 1616 is similar to electronics insert 1516 except that the potting material 1434 is shaped so as to form encapsulating body 1638 which corresponds to the shape of cavity 1620. Similar to cavity 1620, body 1638 has a spherical outer shape or profile, limiting movement of insert 1616 within cavity 1620. In the example illustrated, due to the spherical shape of receptacle 1618, cavity 1620 as a mouth 1624 which is smaller in size than the maximum internal dimensions of cavity 1620 and which is smaller in size than the maximum outer dimensions of insert 1616. During insertion of insert 1616 into cavity 1620, mouth 1624 resiliently flexes or stretches. Upon resiliently returning to and unstressed state, mouth 1624 moves about body 1638 to assist in retaining insert 1616 within cavity 1620.

Plug 1618 is similar to plug 1418. Plug 1618 extends between body 1638 and the exterior of ball 1610. In the example illustrated, plug 1618 is formed from a resiliently compressible or soft material to absorb impacts with ball 1510 such that less forces are transmitted to insert 1616. In the example illustrated, plug 1618 further seals insert 1616 within cavity 1620. In the example illustrated, plug 1618 has a reduced thickness as compared to plug 1418 as mouth 1624 assists in retaining insert 1616 within cavity 1620. In other implementations, plug 1618 may have a larger thickness or may be configured similar to plug 1418.

In some implementations, plug 1418 or 1618 may be omitted, may be supplemented with or may be replaced with one or more materials filled over body 1438 or 1638. For example, in one implementation, cavity 1420 or cavity 1620 is filled with a fluid filler material that at least partially immerses, in one implementation completely submerses, insert 1516 or insert 1616. In one implementation, the fluid filler material is chosen so as to solidify about insert 1516 or insert 1616 through curing or thermosetting. In yet other implementations, the fluid filler material remains in a fluid state, sealed within cavity by an additional plug or by additional outer layers of ball 1410. In other implementations, the plug 1418 or 1618 is omitted and the electronics insert is covered by cover 20 or strip 325 (FIGS. 3 and 4).

Figure 29:
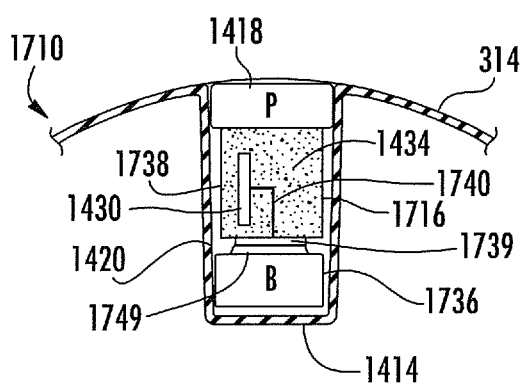
FIG. 29 is a fragmentary sectional view of an another example implementation of the basketball of FIG. 24.

FIG. 29 is a fragmentary sectional view of sporting or game ball 1710, shown as an example basketball. Ball 1710 is similar to ball 1510 except that ball 1710 comprises electronics insert 1716 and battery 1736 in lieu of electronics insert 1516 and battery 1436. Those remaining components of ball 1710 which correspond to components of basketball 1510 are numbered similarly.

Electronics insert 1716 is similar to electronics insert 1516 except that potting material 1434 does not encapsulate a battery, but encapsulates electronics 1430. In the example illustrated, insert 1516 additionally comprises an external electrical contact pad or terminal 1739 which is electrically connected to electronics 1430 by electrical conductor 1740. In the example illustrated, potting material 1434 completely encapsulates electronics 1430 and is solidified about electrical conductor 1740 to seal against electrical conductor 1740. In other implementations, a bore or other passage is formed within body 1738, wherein electric conductor 1740 extends through and within the bore or other passage to terminal 1739. Terminal 1739 facilitates electrical power transfer between battery 1736 and electronics 1430 across terminal 1739 and conductor 1740.

Battery 1736 is similar to battery 1436 except that battery 1736 is distinct and independent, or separable, from insert 1716. Battery 1736 is inserted into cavity 1420 prior to insertion of insert 1716. In another implementation, battery 1736 is inserted into cavity 1420 after insertion of insert 1716 into cavity 1420. Battery 1736 comprises electrical contact pad or terminal 1749 which is configured for electrical contact with terminal 1739 of insert 1716 when both are inserted into cavity 1420. In the example illustrated, terminals 1739 and 1749 rest against and in contact with one another. Electrical power is transmitted across terminals 1739 and 1749 to electrical conductor 1740 and ultimately to electronics 1430. Because battery 1736 is independent of insert 1716, battery 1736 may also be replaced independent of insert 1716, allowing the use of insert 1716 to be continued with a replacement battery. The insert 1716 can also be replaced or removed within or independent of the battery 1736. In one implementation, the plug can be omitted. In such an implementation, the cover 320 or lid can be positioned over the cavity 1420, and be removable or movable to allow for access to the cavity 1420 and replacement or access to the battery 1736 and or insert 1716.

Figure 30:
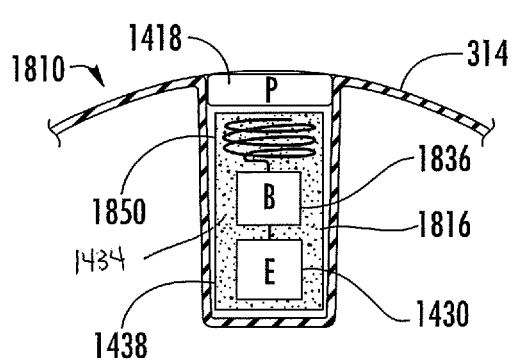
FIG. 30 is a fragmentary sectional view of an another example implementation of the basketball of FIG. 24.

FIG. 30 is a fragmentary sectional view of sporting or game ball 1810, shown as an example basketball. Ball 1810 is similar to ball 1510 except that ball 1810 comprises electronics insert 1816 in lieu of electronics insert 1516 and battery 1436. Those remaining components of ball 1810 which correspond to components of ball 1510 are numbered similarly.

Insert 1816 is similar to insert 1516 except that insert 1816 additionally comprises inductive coil 1850. Inductive coil 1850 comprises an electrically conductive line such as an electrically conductive metal wire, trace or the like which serves as a secondary coil to facilitate inductive charging of battery 1836. In the example illustrated, inductive coil 1850 extends from and is electrically connected to battery 1836 (either directly or through electronics 1430), wherein inductive coil 1850 forms windings or loops within the mass of potting material 1434 (shown with stippling) proximate to or along a portion of body 1438 which is proximate to or adjacent to plug 1418 and the exterior of ball 1810. In such an implementation, potting material 1434 completely encapsulates inductive coil 1850 to protect coil 1850. In another implementation, inductive coil 1850 alternatively extends along an outer surface of encapsulating body 1438 for closer proximity to an exterior basketball 1810 and for enhanced inductive charging. In another implementation, inductive coil 1850 can extend throughout the body 1438. The coil 1850 can extend along over 50 percent of the length of the body 1438. In another implementation, the coil 1850 can extend over 80 percent of the length of the body 1438. In other implementations, the coil 1850 can loop around and/or within the body 1438 over a portion or all of its length. The coil 1850 can extend through any portion of the potting material 1434.

Battery 1836 comprises a rechargeable battery. In the example illustrated, battery 1836 comprises a battery configured to be inductively recharged utilizing coil 1850 as a secondary inductive charging coil. During such recharging, ball 1810 is positioned adjacent to an inductive charger having a primary inductive charging coil which creates an electromagnetic field that encompasses coil 1850. In one implementation, the material and configuration of the primary coil and coil 1850, serving as a secondary coil, have matched or substantially matched resonant frequencies to enhance the rate at which battery 1836 is inductively charged. In another implementation, the primary coil of the inductive charger and coil 1850 may have different resonant frequencies.

FIG. 31 is a fragmentary sectional view of sporting or game ball 1910, shown as an example basketball. Ball 1910 is similar to ball 1810 except that ball 1910 comprises electronics insert 1816 in lieu of electronics insert 1916 and plug 1918. Those remaining components of ball 1810 which correspond to components of ball 1510 are numbered similarly.

Insert 1916 is similar to insert 1816 except that insert 1916 comprises electrical contact pad or terminal 1954 in place of coil 1850. Terminal 1954 comprises an electrically conductive contact along an exterior of body 1438 for making contact with a corresponding electrically conductive contact of plug 1918. In the example illustrated, terminal 1954 extends along an axial end of body 1438 and is electrically connected to battery 1936 directly, or indirectly through electronics 1430, by one or more electrical conductors extending within body 1438. Terminal 1954 facilitates electrical connection to plug 1918 while both insert 1916 and plug 1918 are within cavity 1420.

Plug 1918 is similar to plug 1418 except that plug 1918 additionally comprises an electrically conductive contact pad or terminal 1956 and an inductive secondary winding or coil 1950. Terminal 1956 comprises an electrically conductive pad or pads along an exterior of plug 1918 so as to come into electrical contact with terminal 1954 when positioned upon or resting upon insert 1916 within cavity 1420. Terminal 1956 facilitates electrical connection of battery 1836 and coil 1950 through one or more electrical conductors and terminals 1954, 1956. In yet other implementations, one of insert 1916 and plug 1918 may include an electrically conductive prong or pin while the other of insert 1916 and plug 191 comprises an electrically conductive port removably receiving the prong or pin to facilitate electrical interconnection between insert 1916 and plug 1918. In still other implementations, battery 1936 is alternatively electrically connected to coil 1950 by an electrically conductive wire extending between insert 1916 and plug 1918.

Coil 1950 is similar to coil 1850 except the coil 1950 is carried by plug 1918. In the example illustrated, coil 1950 is embedded or contained within the material plug 1918. In one implementation, coil 1950 is encapsulated by the material of plug 1918. In yet other implementations, coil 1950 is alternatively formed along an exterior surface of plug 1918 or is formed both within plug 1918 and along the exterior surface of plug 1918. In one implementation, coil 1950 is configured so as have a resonant frequency matching or substantially similar to the resonant frequency of the primary charging inductive coil of the wireless or inductive charger to enhance inductive charging. As with coil 1850, coil 1950 serves as a secondary inductive charging coil to facilitate inductive charging of rechargeable battery 1836. In one implementation, insert 1916 additionally comprises coil 1850 which is electrically connected between battery 1836 and terminal 1954 within body 1438. By including coils 1850 in insert 1916 and by including coil 1950 and plug 1918, inductive charging is enhanced.

FIGS. 32 and 33 are sectional views of ball of ball 2010, another implementation of ball 310, shown as an example basketball. Ball 2010 is similar to ball 1910 except that ball 2010 comprises plug 2018 and inductive charging coil 2050 in lieu of, or in addition to, plug 1918 and coil 1950, respectively. The remaining components of ball 2010 illustrated in FIGS. 32 and 33 which correspond to components of basketball 1910 and 310 are numbered similarly.

Plug 2018 is similar to plug 1918 except that plug 2018 comprises pass-through electrical conductors 2020 extending from terminal 1956 in lieu of coil 1950. Electrical conductors 2020 electrically connect terminal 1956 to coil 2050. In another implementation, plug 2018 comprises coil 1950 as well as electrical conductors 2020. For example, one implementation, coil 1950 itself is electrically connected to ends of coil 2050. In yet other implementations, 2020 may extend through or alongside of plug 2018 directly into body 1438 and into connection with battery 1836 directly, or indirectly through electronics 1430.

Inductive charging coil 2050 comprises an electrically conductive line, such as a metal wire, filament or electrically conductive trace configured to serve as a secondary winding or coil for inductive charging. Inductive charging coil 2050 extends outwardly beyond cavity 1420 and a wall the outermost surface 2056 of ball 2010. For purposes of this disclosure, a phrase referring to an electrically conductive line extending "along a surface" such as "along the outermost surface" means that the electrically conductive line follows the general contour or shape of the surface, in contrast to extending directly through the one more underlying the surface, either perpendicular to the surface or at an angle relative to the surface. To "follow the general contour shape of the surface" means that the line extends parallel to or substantially parallel to the surface. For example, an electrically conductive extending along the surface of a sphere, such as a basketball, follows the general circumferential surface of the sphere, circumferentially extending in an arc about a center of the ball. The phrase "along a surface" does not necessarily mean that the electrically conductive line is on top the surface. The phrase "along a surface" encompasses an electrically conductive line following the contour shape of the surface either on a top of the surface, below the top of the surface such as within a layer forming the surface, or on a bottom of the layer forming the surface.

In the example illustrated, coil 2050 comprise an electrically conductive line extending between the innermost surface 2057 of bladder 314 and the outermost surface 2056 of the outermost layer 2058 of ball 2010. In the example illustrated, coil 2050 extends between the outermost surface 2060 of bladder 314 and the innermost surface 2062 of the outermost layer 2058. As shown by FIG. 32, in the example illustrated, coil 2050 extends at least 60°, nominally at least 180°, and in the example, substantially 360° about ball 2010. In the example illustrated, coil 2050 continuously extends all the way around ball 2010. In one implementation, coil 2050 comprises multiple electrically conductive lines extending radially outward from adjacent to plug 2018 to encompass multiple regions of ball 2010. For example, in one implementation, coil 2050 extends about ball 2010 along line similar to that the lines of seams 319 shown in FIG. 1. In other implementations, coil 2050 alternatively extends partially around ball 2010 only to loopback towards the connection at plug 2018. As with coil 1950, coil 2050 serves as a secondary inductive charging coil or winding to inductively charge battery 1836. The enlarged area of coil 2050 facilitates enhanced inductive charging. The enlarged coil 2050 can enable the ball 2010 to be placed onto a primary coil in any orientation of the ball, and is not limited to locating the ball at the location near the electronics or body 1438.

FIG. 34 is a fragmentary sectional view illustrating sports ball 2110, shown as a basketball, another implementation of ball 2010. Ball 2110 is similar to ball 2010 except that ball 2110 comprises insert 2116, electrical contact pad(s) 2156 and plug 1418 (described above) in lieu of insert 1916 and plug 2018, respectively. Insert 2116 is similar to insert 1916 except that insert 2116 comprises electrically conductive contact pad 2154 in lieu of electric conductive contact pad or terminal 1954. Electrically conductive contact pad 2154 is electrically connected to rechargeable battery 1836 by one or more electrical conductors either directly or indirectly through electronics 1430. Electrically conductive contact pad 2154 extends along an outer surface of body 1438 for electrical connection with corresponding logical contact pads 2156 along the interior of cavity 1420. In the example illustrated, pad 2154 extends completely about an exterior circumferential surface of body 1438, facilitating reliable contact with the corresponding contact pads 2156 along cavity 1420.

Contact pads 2156 comprise pads of electrically conductive material setting along the interior surface of cavity 1420 and allegedly connected to coil 2050. Contact pads 2156 are located and sized to make an electrical connection with contact pads 2154 when body 1438 of insert 2116 is inserted fully into the cavity 1420. In the example illustrated, contact pads 2156 comprise a continuous ring of electrically conductive material circumscribing an interior surface of cavity 1420 at a height or location corresponding to the height or location of contact pads 2154. Contact pads 2154, 2156 electrically connect to one another to facilitate electrical connection of battery 1836 to the inductive charging coil 2050.

Figure 35:
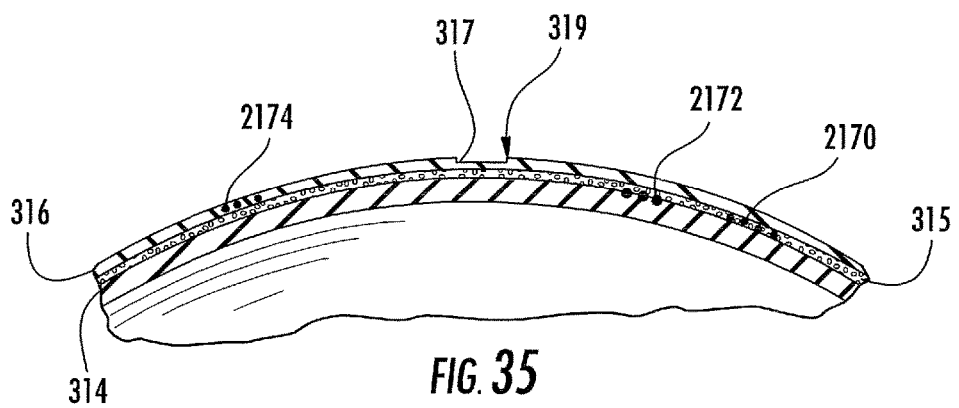
FIG. 35 is a fragmentary sectional view of a portion of an example implementation of the basketball of FIG. 32.
Figure 36:
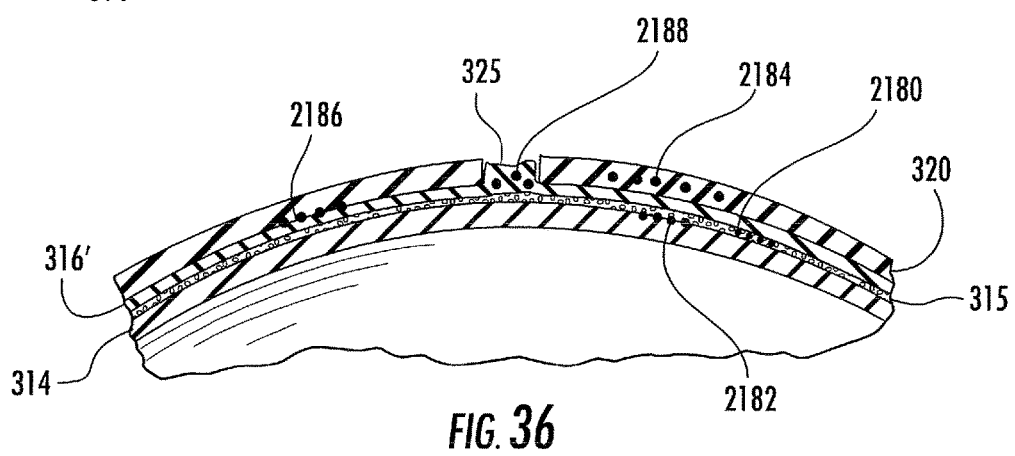
FIG. 36 is a fragmentary sectional view of a portion of an example implementation of the basketball of FIG. 32.

FIGS. 35 and 36 illustrate example locations for coil 2050 along the surface of the ball. FIG. 35 corresponds to FIG. 2 with the addition of coil 2050 which is connected to insert 1916 as shown and described with respect to FIG. 33 or insert 2116 as shown and described respect to FIG. 34. As shown by FIG. 35, the electrically conductive lines comprise (1) electrically conductive lines 2170 extending within and for at least a part of the layer of windings 315, (2) electrically conductive lines 2172 sandwiched between bladder 314 and windings 315, such as being formed on the exterior surface of bladder 314 prior to the application of windings 315 and/or (3) electrically conductive lines 2174 integrally formed within an as part of the layer forming cover 316.

FIG. 36 corresponds to FIG. 3 with the addition of coil 2050 which is connected to insert 1916 as shown and described with respect to FIG. 33 or insert 2116 as shown and described respect to FIG. 34. As shown by FIG. 36, the electrically conductive lines comprise (1) electrically conductive lines 2180 extending within and forming at least a part of the layer of windings 315, (2) electrically conductive lines 2182 sandwiched between bladder 314 and windings 315, such as being formed on the exterior surface of bladder 314 prior to the application of windings 315, (3) electrically conductive lines 2184 integrally formed within an as part of the layer forming cover 316', (4) electrically connected lines 2186 sandwiched between the layer forming cover 316' and cover panel 320 and/or (5) electrically conductive lines 2188 embedded within strips 325. In other implementations, coil 2050 may be formed by electrically conductive lines situated at other locations along the surface of a ball.

Figure 37:
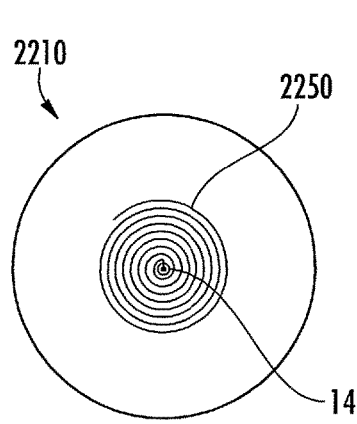
FIG. 37 is a side view of another example implementation of the basketball of FIG. 32.

FIG. 37 the top view of another example sports or game ball 2200, shown as an example basketball. Ball 2210 is similar to ball 2010 (or ball 2110) except that ball 2210 comprises secondary inductive charging coil 2250 in lieu of coil 2050. Coil 2250 is similar to coil 2050 in that coil 2250 is located between the innermost surface 2057 of bladder 314 and the outer most surface 2056 of the ball. Unlike coil 2050, coil 2250 helically or spirally extends about receptacle 1420 and the received plug 2018, 1418. Coil 2250 provides a compact secondary inductive charging coil centered about a predefined location to facilitate inductive charging. In one implementation, coil 2250 can extend over 10 percent of the outer surface of the bladder 314. In another implementation, the coil 2250 can extend over 25 percent of the outer surface of the bladder. In another implementation, the coil 2250 can extend over 50 percent of the bladder. The coil 2250 can be positioned within the bladder 314, on the bladder 314, within the windings 315, as part of the windings 315, over the windings 315, under, within or over the cover (or outer carcass layer 316 or 316'), and under, within or over the cover 320. In another implementation, the coil 2250 can take other closed loop paths other than a spiral path.

In each of implementation is described above with respect to FIGS. 30-37, the coil formed by the electrically conductive line is described as being connected directly or indirectly to rechargeable battery 1836, wherein the coil serves as a secondary charging coil for inductive charging of battery 1836. In other implementations, the coil formed by electrically conductive is alternatively connected to transmitter 133 of electronics 1430, wherein the electrically conductive line serves as an antenna for transmitting and receiving signals or as an RFID (radio frequency identification) antenna for communicating with an external RFID device. In some implementations, multiple coils or multiple electrically conductive lines may be provided, wherein one of the electrically conductive lines is utilized for charging rechargeable battery 1836 and the other of the electrically conductive lines utilized as an antenna.

Figure 38:
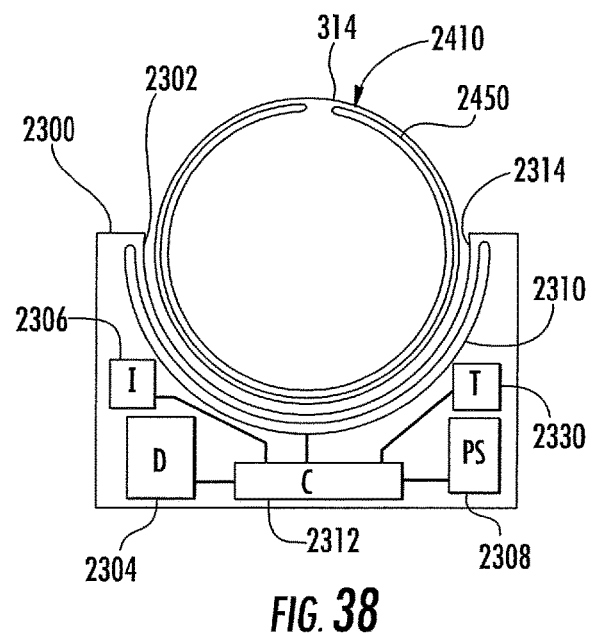
FIG. 38 is a sectional view of an example ball interaction station receiving another example implementation of the ball of FIG. 32.

FIG. 38 is a sectional view schematically illustrating an example ball interaction station 2300. In the example illustrated, ball interaction station 2300 comprises an inductive charging station configured to inductively charge a ball, such as ball 2410. In other implementations, ball interaction station 2300 may be configured to inductively charge other balls such as balls 2110, 2010, 1910 or 1810. In the example illustrated, station 2300 comprises charging platform 2302, display 2304, input 2306, power sensor 2308, primary charging coil 2310 and charging controller 2312. In the example illustrated, ball 2410 is similar to ball 2010 (or ball 2110) except that ball 2410 comprises coil 2450 in lieu of coil 2050. Coil 2450 is similar to coil 2050 except that coil 2450 extends from receptacle 1420 and follows the surface of ball 2410 180° about ball 2410 before looping back to the electronics and battery within cavity 1420 (shown in FIG. 32). As with coil 2050, coil 2450 is located between the innermost surface of bladder 314 and outer more surface of the outermost layer of ball 2410.

Charging platform 2302 comprises a platform upon which ball 2410 rests during inductive charging. In the example illustrated, charging platform 2302 forms a concave chamber 2314 extending about ball 2410. In the example illustrated, chamber 2314 extends at least about 60° and nominally at least about 180° about all sides of ball 2410, providing a large region in which primary charging coil 2310 extends opposite to secondary charging coil 2450 of ball 2410 for enhanced charging. In other implementations, charging platform 2300 may have other shaped charging chambers which extend about different extents of the ball being charged during charging. For example, in another implementation, charging platform 2302 may comprise a flat platform having one or more structures to retain ball 2410 in place during charging.

Display 2304 comprises a screen, monitor, display panel or the like by which information is presented to a person charging ball 2410. For example, in one implementation, display 2304 may present a charging status for ball 2410. In yet another implementation, display 2304 (schematically illustrated) may comprise a series of LED lights or other indicators for displaying or indicating a charging status for ball 2410. In some implementations, display 2304 may be omitted.

Input 2306 comprises one or more devices by which a person may enter data, instructions or commands. For example, in one implementation, station 2300 may be authorized to charge only authorized balls, wherein input 2306 may be utilized for the entry of authorization codes. In yet another implementation, station 2300 may differently charge differently constructed balls, wherein input 2306 facilitates the input of an identification of the particular ball to be charged. In one implementation, input 2306 may be incorporated as part of a display screen in the form of a touch screen. In yet other implementations, input 2306 may be omitted.

Power sensor 2308 comprises one or more sensors to determine a charging level of ball 2410. Signals from power sensor 2308 are transmitted to controller 2312 for presentation to the person charging ball 2410 or for use by controller 2312 in controlling the charging of ball 2410. In yet other implementations, power sensor 2308 may be omitted.

Coil 2310 comprises an electrically conductive line form within extending along the exterior surface of platform 2302 so as to extend opposite to coil 2450 of ball 2410. Coil 2310 serves as a primary inductive charging coil which, upon being electrically powered, creates and electromagnetic field encompassing coil 2450 within chamber 2314. The electromagnetic field induces electrical current within coil 2450, wherein the electrical current inductively charges the rechargeable battery 1836 (shown in FIG. 33 or FIG. 34). In one implementation, coil 2310 is a resonant frequency matching or substantially matching the resonant frequency of coil 2450 to enhance inductive charging efficiency.

Controller 2312 comprise one or more processing units to generate control signals controlling the inductive charging a basketball 2410. In one implementation, controller 2312 may vary or control the transmission of electric power across coil 2310 depending upon the current state of charge of ball 2410 to optimize inductive charging efficiency or time. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 2312 may be embodied as part of one or more application-specific integrated circuits (ASICs). Unless otherwise specifically noted, the controller is neither limited to any specific combination of hardware circuitry and software, nor to any particular source for the instructions executed by the processing unit.

In one implementation, station 2300 additionally serves as a communication hub with ball 2410. For example, in one implementation, charging station 2300 further comprises transceiver 2330 facilitating wireless communication with electronics 1430 of ball 2410. In such an implementation, controller 2312, following instructions contained in a non-transitory computer-readable medium communicate with ball 2410 through transceiver 2330. In one implementation, in response to a backup mode being selected on input 2306 by a person, charging station 2300 retrieves data and information from ball 2410 during charging and stores such information in a memory associated with charging station 2300. In one implementation, the data stored on the memory is accessible through a wired or wireless connection or through a communication support provided in charging station 2300. In another implementation, station 2300 serves as a communications hub by forwarding the information retrieved from ball 2410 during charging to a remote computing device or storage facility. In one implementation, under a user selectable mode of operation, station 2300 additionally uploads information, programming updates, patches or the like to electronics 1430 of ball 2410 while ball 2410 is being charged. In one implementation, station 2300 may present data retrieved from ball 2410 or derived from ball 2410 on display 2304 while ball 2410 is being charged. In one implementation, station 2300 may comprise a sufficiently large display 2304 so as to display or visibly present ongoing score of an ongoing game being played utilizing ball 2410 when station 2300 is charging ball 2410 or when ball 2410 is being utilized. In one implementation, station 2300 may be linked or synced with more than one ball, wherein one ball is charging while another ball is being utilized and wherein station 2300 displays statistics and/or an ongoing game score based upon data received from the other ball being used. In some implementations, rather than utilizing inductive charging, station 2300 may employ a prong or other contact-to-contact electrical conductors to facilitate charging of rechargeable battery 1836. In still other implementations, station 2300 may omit any such charging of ball 2410, wherein station 2300 serves as a backup station or communications hub as described above.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a game ball;
electronics to sense motion of the game ball;
a potting compound encapsulating the electronics, the potting compound forming an encapsulating body sized and shaped to fit within a cavity of the game ball;
an electrical conductor extending from the electronics to an exterior of the encapsulating body, wherein at least a portion of the encapsulating body seals about and against the electrical conductor;
an electrically conductive line to extend along a surface of the game ball, the electrically conductive line electrically connected to the electrical conductor; and
a plug at least partially received within the cavity between the encapsulating body and an exterior of the game ball, wherein the electrically conductive line is embedded within the plug.

2. The apparatus of claim 1, wherein the cavity of the game ball is cylindrical and wherein the encapsulating body is cylindrical.

3. The apparatus of claim 1, wherein the potting compound is selected from a group of potting compounds consisting of polyurethane and silicone.

4. The apparatus of claim 1, wherein the encapsulating body completely encloses the electronics.

5. The apparatus of claim 1 further comprising the game ball, wherein the electrically conductive line extends along the surface of the game ball.

6. The apparatus of claim 5, wherein the game ball comprises an inflatable bladder and a cover about the bladder, wherein the electrically conductive line extends along and between an outer surface of the bladder and an inner surface of the cover.

7. The apparatus of claim 6 further comprising a battery connected to the electronics, wherein the electrically conductive line is electrically connected to the battery to facilitate charging of the battery.

8. The apparatus of claim 1, wherein the electrically conductive line extends at least 180° about the game ball.

9. The apparatus of claim 1, wherein the electrically conductive line extends at least 360° about the game ball.

10. The apparatus of claim 1, wherein the electronics comprises a transmitter and wherein
the electrical conductive line serves as an antenna for the transmitter.

11. The apparatus of claim 1 further comprising:
a rechargeable battery electrically connected to the electronics; and
a secondary inductive coil electrically connected to the rechargeable battery.

12. The apparatus of claim 11 further comprising a charging platform comprising a primary inductive coil.

13. The apparatus of claim 1, wherein the electrical conductor comprises a first electrical contact terminal and wherein the plug comprises a second electrical contact terminal connected to the electrically conductive line and in abutting contact with the first electrical contact terminal.

14. A game ball comprising:
an inflatable body;
electronics supported by the inflatable body; and
an electrical conductive line electrically connected to the electronics and extending along a surface of the inflatable body at least 60 degrees about the inflatable body.

15. The game ball of claim 14, wherein the inflatable body forms a cavity and wherein in the game ball further comprises an encapsulating body of potting compound encapsulating the electronics, the encapsulating body sized and shaped to be received within the cavity.

16. The game ball of claim 14 further comprising a seam and wherein the electrically conductive line extends along the seam at least 60° about the inflatable body.

17. The game ball of claim 14 further comprising a layer of windings about the inflatable body, wherein the electrically conductive line is embedded within informed at least a part of the layer of windings.

18. The game ball of claim 14 further comprising consecutive cover panels about the inflatable body and strips between the consecutive cover panels, wherein the electrically conductive line is embedded within the strips.

19. The game ball of claim 14, wherein the electrically conductive line comprises a single continuous uninterrupted strand of electrically conductive material that extends at least 60° about the inflatable body.

20. The game ball of claim 19, wherein the electrically conductive line extends at least 180° about the inflatable body.

21. The game ball of claim 19, wherein the electrically conductive line continuously extends at least 360° about the inflatable body.

22. An apparatus comprising:
a game ball;
electronics to sense motion of the game ball;
a potting compound encapsulating the electronics, the potting compound forming an encapsulating body sized and shaped to fit within a cavity of the game ball;
an electrical conductor extending from the electronics to an exterior of the encapsulating body, at least a portion of the encapsulating body seals about and against the electrical conductor;
an electrically conductive line electrically connected to the electrical conductor; and
a plug at least partially received within the cavity between the encapsulating body and an exterior of the game ball, the electrically conductive line being embedded within the plug to form a coil within the plug.

* * * * *